US010303983B2

(12) United States Patent
Tsunoda

(10) Patent No.: US 10,303,983 B2
(45) Date of Patent: May 28, 2019

(54) IMAGE RECOGNITION APPARATUS, IMAGE RECOGNITION METHOD, AND RECORDING MEDIUM

(71) Applicant: CANON KABUSHIKI KAISHA, Tokyo (JP)

(72) Inventor: Takamasa Tsunoda, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/171,551

(22) Filed: Jun. 2, 2016

(65) Prior Publication Data

US 2016/0358338 A1 Dec. 8, 2016

(30) Foreign Application Priority Data

Jun. 5, 2015 (JP) ................. 2015-115171

(51) Int. Cl.
G06K 9/46 (2006.01)
G06K 9/62 (2006.01)

(52) U.S. Cl.
CPC ......... G06K 9/6267 (2013.01); G06K 9/4671 (2013.01); G06K 9/6219 (2013.01)

(58) Field of Classification Search
CPC .... G06T 7/136–7/194; G06K 9/00664; G06K 9/00671; G06K 2209/27; G06K 9/00624; G06K 9/00684–9/00704; G06K 9/6267; G06K 9/6219; G06K 9/4671
USPC ........................................ 382/181, 195, 224
See application file for complete search history.

(56) References Cited

U.S. PATENT DOCUMENTS

2006/0039690 A1* 2/2006 Steinberg ........... G06K 9/00248
396/155
2012/0045094 A1  2/2012 Kubota
2012/0113272 A1  5/2012 Hata

FOREIGN PATENT DOCUMENTS

| JP | 2006-208339 A | 8/2006 |
| JP | 2008-086021 A | 4/2008 |
| JP | 2010-220197 A | 9/2010 |
| JP | 2012-044428 A | 3/2012 |
| JP | 2012-100173 A | 5/2012 |
| JP | 2013-084098 A | 5/2013 |
| JP | 2014-199519 A | 10/2014 |
| JP | 2015-082245 A | 4/2015 |
| WO | 2012/170462 A2 | 12/2012 |
| WO | 2015/024871 A1 | 2/2015 |

OTHER PUBLICATIONS

"EXIF Data Explained." Photography Mad, Sep. 21, 2011, http://www.photographymad.com/pages/view/exif-data-explained. Accessed Nov. 15, 2017.*

(Continued)

Primary Examiner — Geoffrey E Summers
(74) Attorney, Agent, or Firm — Canon USA Inc., IP Division

(57) ABSTRACT

On the basis of subsidiary information associated with image data, an image for the image data is segmented into multiple subregions, and feature values are extracted for each of the subregions obtained through the segmentation. The category for each of the subregions is determined on the basis of the extracted feature values.

17 Claims, 17 Drawing Sheets

(56) References Cited

OTHER PUBLICATIONS

Cieplinski, Leszek. "MPEG-7 color descriptors and their applications." International Conference on Computer Analysis of Images and Patterns. Springer, Berlin, Heidelberg, 2001. (Year: 2011).*
Szummer, M., and R. W. Picard. "Indoor-outdoor image classification." Content-Based Access of Image and Video Database, 1998. Proceedings., 1998 IEEE International Workshop on. IEEE, 1998. (Year: 1997).*

* cited by examiner

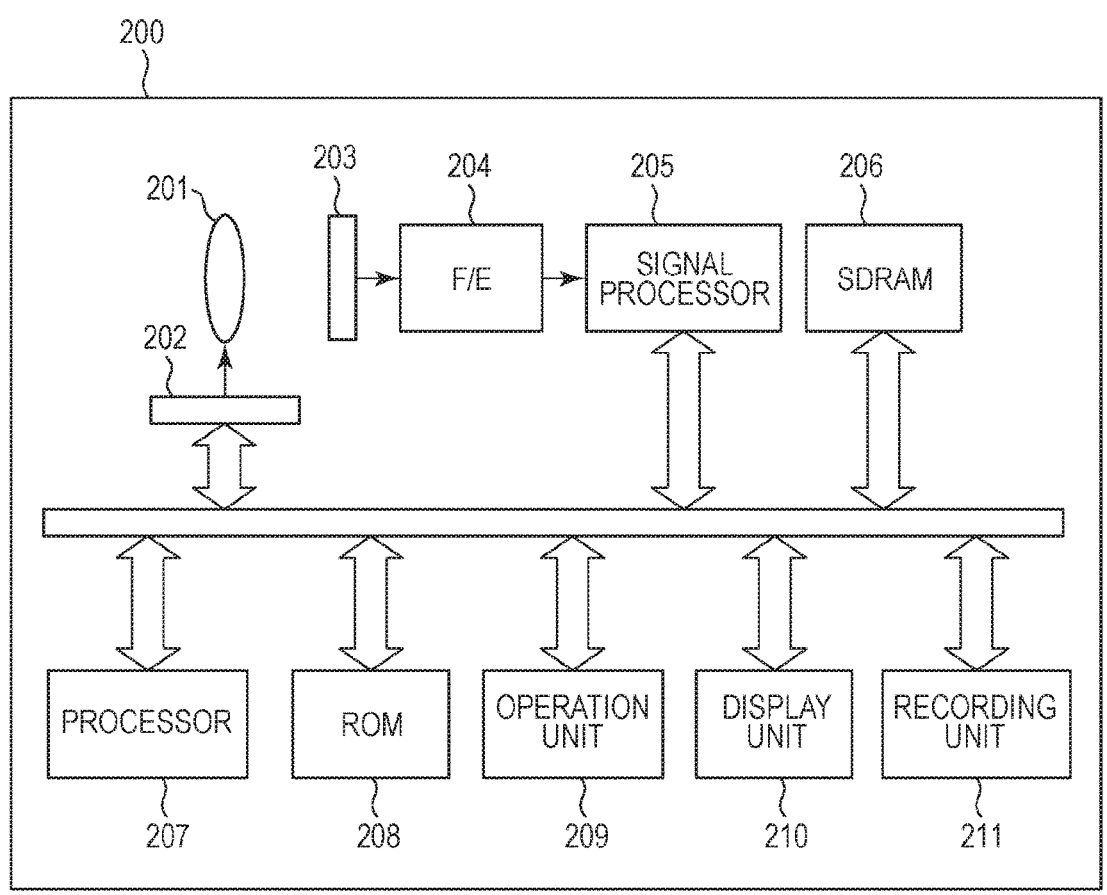

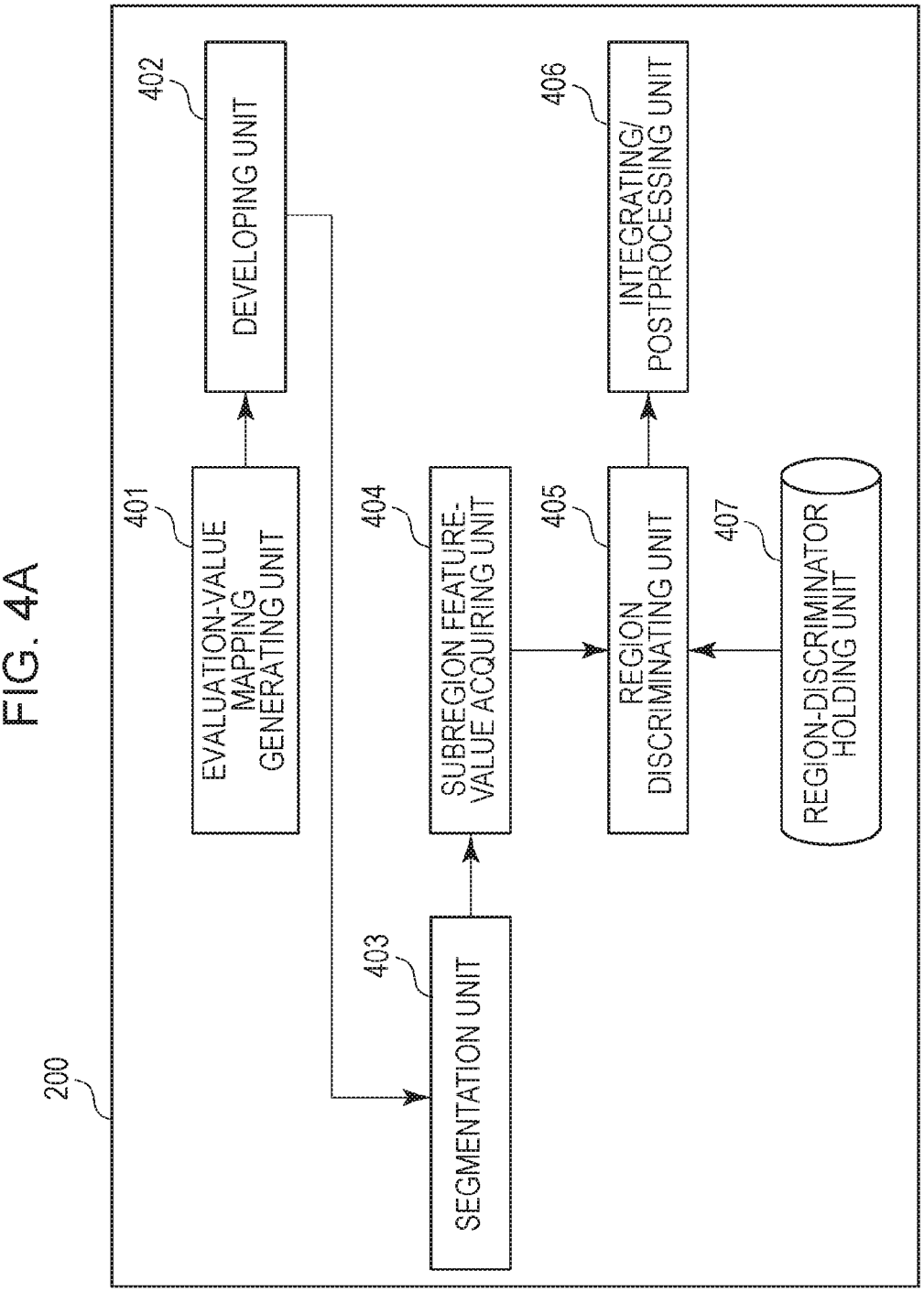

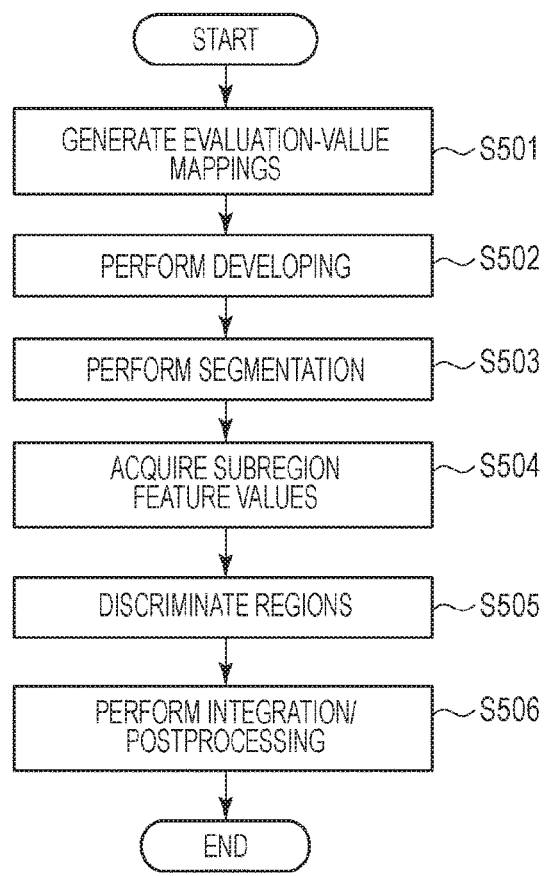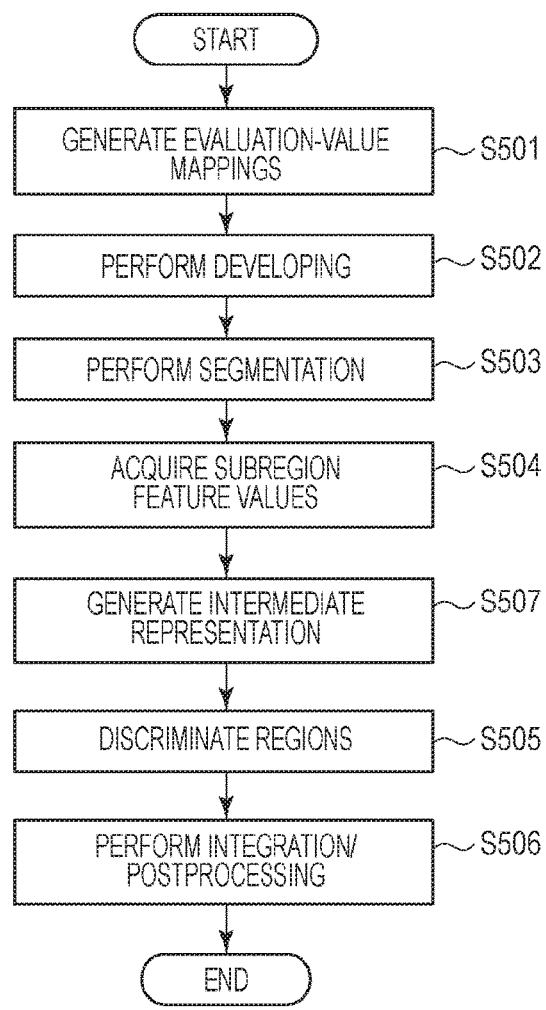

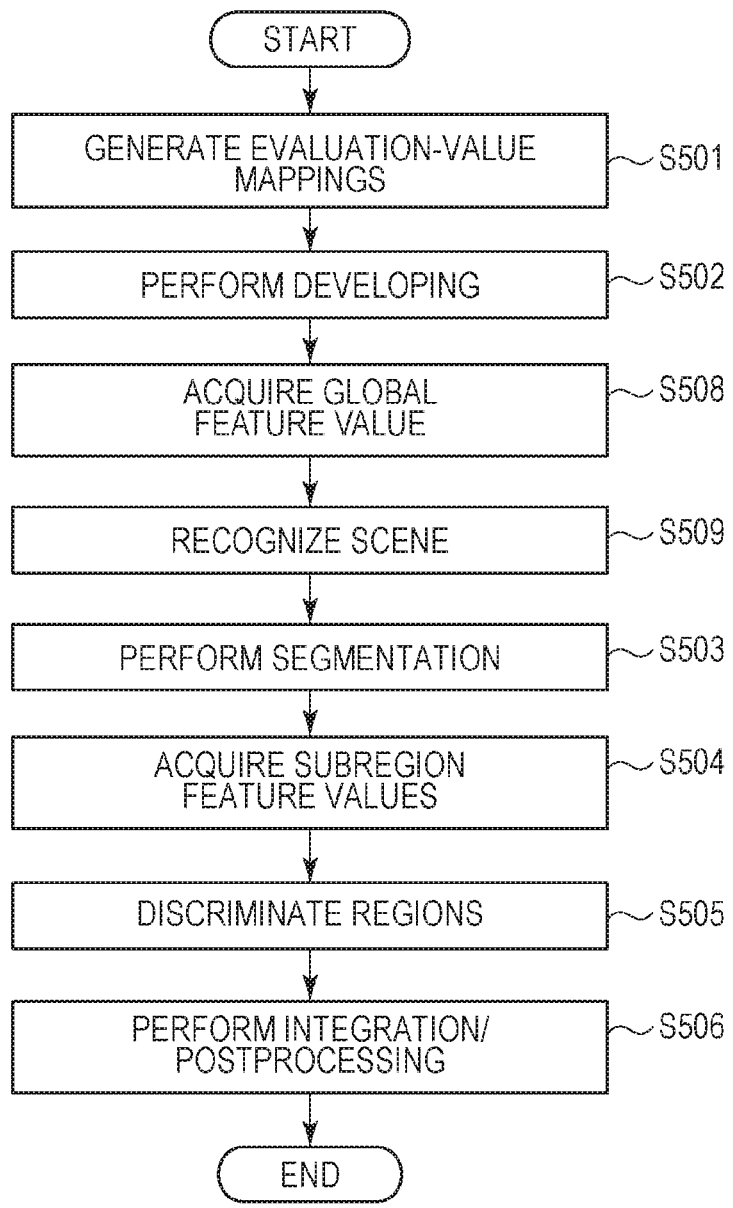

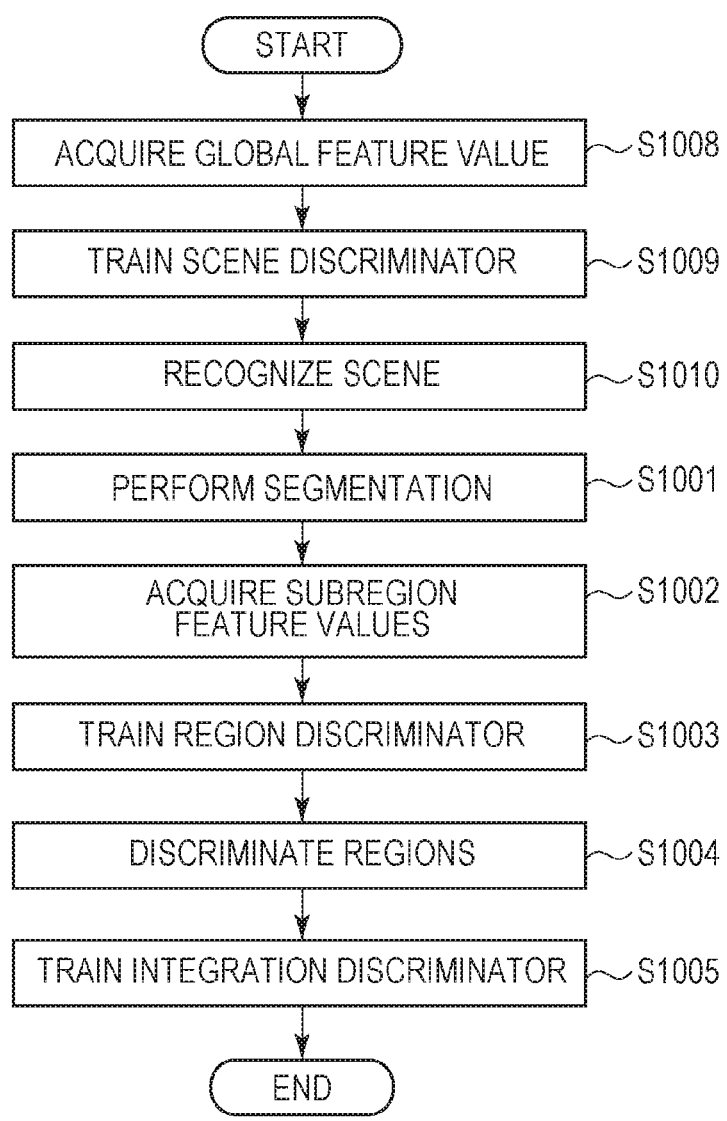

IMAGE RECOGNITION APPARATUS, IMAGE RECOGNITION METHOD, AND RECORDING MEDIUM

BACKGROUND OF THE INVENTION

Field of the Invention

The present invention generally relates to image recognition, and more specifically it relates to technology for segmenting an input image into regions belonging to predetermined categories.

Description of Related Art

Research on image recognition technology for recognizing a target object from an input image is being carried out with increasing interest. Examples of the image recognition include, among others, face recognition of determining the position of a face which is present in an image, human-body detection of detecting a human body within an image, and scene recognition of recognizing the environment or condition in which an image is captured. In image recognition, a file format, such as Joint Photographic coding Experts Group (JPEG) or bit map (BMP), which is typically used for an input image is designed in terms of storage space (size of image) and viewing details (amount of information). Therefore, a red, green, blue (RGB) image which is read from data in a conventional file format fails to provide information sufficient for highly accurate image recognition. Therefore, a proposal that information obtained upon capture of an image is to be used for image recognition has been also made.

In Japanese Patent Application Laid-Open No. 2010-220197, a technique is described in which a shadow region is discriminated from a non-shadow region to obtain an adequate white balance (WB) coefficient for each region in an image which is captured in fine weather and in which blue fogging may occur. In Japanese Patent Application Laid-Open No. 2010-220197, parameters used upon capture of an image are used to obtain a photometric value, to correct the brightness values of pixels by using the photometric value, to generate a photometric-value mapping for the pixels, to determine whether the scene of the image is an indoor scene or an outdoor scene, and to determine shadow regions when the scene is an outdoor scene. Examples of the parameters used upon capture of an image include exposure time, sensitivity, and numerical aperture (F-number value), among others.

In Japanese Patent Application Laid-Open No. 2008-86021, a technique is described in which each of the frequency, the signal-to-noise (S/N) ratio, the compression scheme, the brightness, and the like of an input image signal is subjected to clustering, and in which coefficients corresponding to class classification results are used to perform image processing.

Image recognition processing in which an input image is segmented into regions belonging to predetermined categories is known. This type of processing is called "semantic segmentation". Image recognition processing using semantic segmentation may be applied to image correction, scene interpretation, and the like which produce results suitable for objects to be recognized.

However, for image recognition processing using semantic segmentation, a configuration in which regions belonging to categories are accurately recognized by using subsidiary information obtained upon capture of an image has not been proposed nor effectively implemented.

SUMMARY OF THE INVENTION

According to an embodiment of the present invention, an image recognition apparatus includes an acquiring unit, a segmenting unit, an extracting unit, and a determination unit. The acquiring unit acquires image data and subsidiary information associated with the image data. The subsidiary information includes at least information about an auto-exposure operation that is performed when an image for the image data is captured. The segmenting unit segments the image for the acquired image data into a plurality of subregions on the basis of the acquired subsidiary information. The extracting unit extracts a feature value of each of the plurality of subregions obtained through the segmentation. The determination unit determines a category for each of the plurality of subregions on the basis of the extracted feature value.

Further features of the present invention will become apparent from the following description of exemplary embodiments with reference to the attached drawings.

BRIEF DESCRIPTION OF THE DRAWINGS

FIG. 2 is a diagram illustrating the hardware configuration of an image recognition apparatus according to the first embodiment.

FIGS. 4A and 4B are block diagrams illustrating the schematic functional configuration of the image recognition apparatus according to embodiments.

FIGS. 5A to 5C are flowcharts of processes for semantic segmentation according to the embodiments.

FIGS. 10A to 10C are flowcharts of training processes performed by training apparatuses according to the embodiments.

DESCRIPTION OF THE EMBODIMENTS

First Embodiment

Figure 1A:
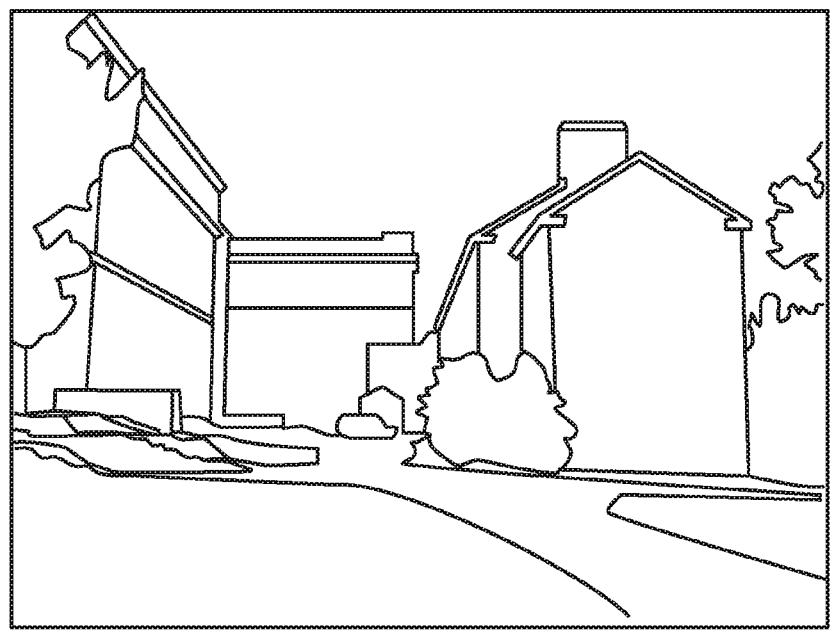
FIGS. 1A and 1B are diagrams for describing a concept of semantic segmentation according to a first embodiment.
Figure 1B:
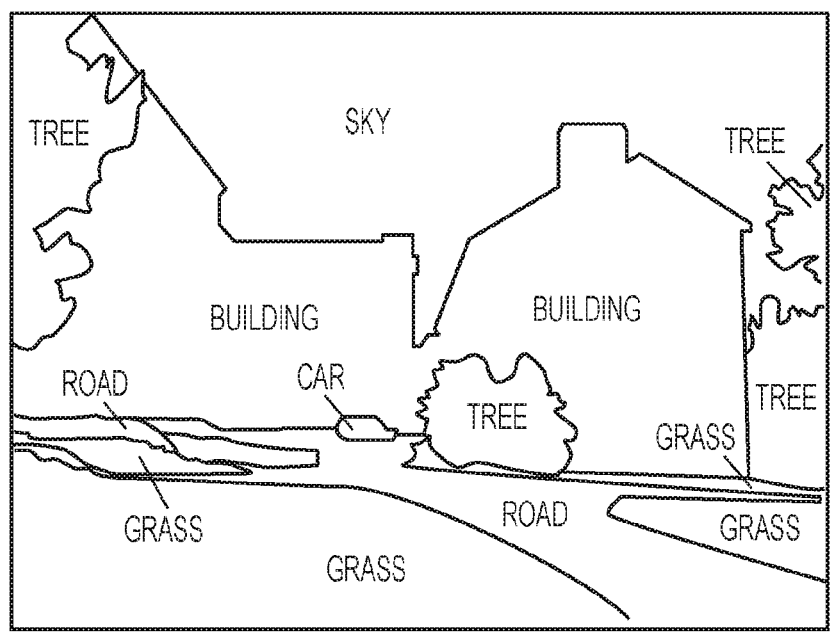

A first embodiment of the present invention will be described in detail below. Image recognition processing using semantic segmentation according to the first embodiment will be described. FIGS. 1A and 1B are diagrams for describing a concept of the image recognition processing using semantic segmentation. In the first embodiment, semantic segmentation is image recognition processing in which the category of a region in which an object to be recognized in an input image is present is determined by using a feature value and the like of the region. For example, categories, such as Sky and Building, of an object to be recognized are defined in advance by a person. The semantic segmentation is a process of outputting a category for each pixel as illustrated in FIG. 1B, for an input image as illustrated in FIG. 1A. FIG. 1B illustrates a state in which correct region categories are assigned to the input image. Such a mapping in which correct region categories are assigned is referred to as a ground truth (GT).

The configuration of an image recognition apparatus according to the first embodiment will be described. In the first embodiment, an example in which the image recognition apparatus is configured as an imaging device such as a digital camera will be described. FIG. 2 is a block diagram illustrating the schematic hardware configuration of an image recognition apparatus 200 according to the first embodiment.

In FIG. 2, an optical system 201 includes a zoom lens, a focusing lens, an aperture, and a shutter. An optical system controller 202 includes a zoom motor, a focusing motor, an aperture motor, and a shutter motor which control the zoom lens, the focusing lens, the aperture, and the shutter. Each of the motors is driven by a motor driver. The motor driver receives a drive signal from a processor 207 described below.

A sensor 203 includes an image sensor which forms, on the light-receiving surface, an object image which enters through the optical system. An RGB color filter in a Bayer arrangement is attached to the pixels of the image sensor. A front end (F/E) 204 receives an object image signal from the sensor 203, performs noise removal, gain adjustment, and analog-to-digital (A-D) conversion on the object image signal, and outputs a digitized object image signal and RAW-RGB data to a signal processor 205.

Figure 3:
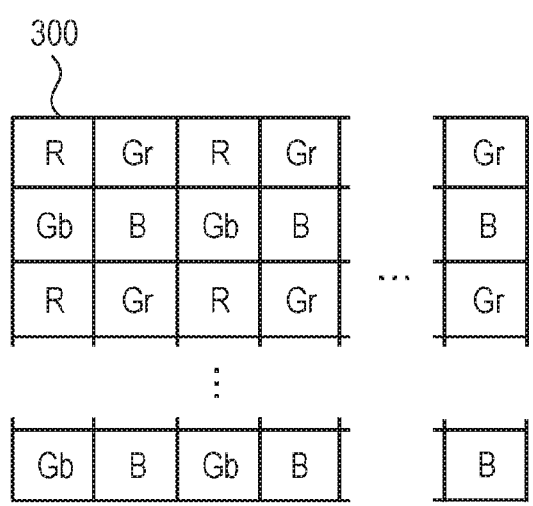
FIG. 3 is a diagram illustrating an exemplary Bayer arrangement according to the first embodiment.

The RAW-RGB data is an image in an RGB Bayer arrangement. FIG. 3 illustrates an exemplary Bayer arrangement. In FIG. 3, R represents a color filter passing visible light in a spectrum band corresponding to red; Gr, to green; Gb, to green; and B, to blue. The different symbols, Gr and Gb, are used to distinguish their arrangements from each other, but Gr and Gb have the same filter characteristics.

The signal processor 205 performs calculation of evaluation values for automatic focusing (AF), auto-exposure (AE), and automatic white balance (AWB), and also performs a resizing process for use of a resized image in image processing using semantic segmentation. Calculation of AF, AE, and AWB evaluation values will be described in detail below. In addition, the signal processor 205 performs various processes necessary as an image capturing apparatus. For example, the signal processor 205 performs correction of black (OB clamping) using an offset component in the RAW-RGB data, a WB process, a demosaicing process in which an RGB image in the Bayer arrangement is interpolated, and a color correction process in which spectral characteristics of the RGB color filter of the image sensor are made close to ideal characteristics. Further, the signal processor 205 performs a contour correction process for improving high resolution of an RGB image, and noise reduction of reducing random noise and fixed pattern noise which are superimposed on an output signal from the image sensor. Other than these, the signal processor 205 performs, for example, a gamma correction process of correcting nonlinearity of a display, and an RGB-YCbCr conversion process of converting an RGB image into an YCbCr image (Y/C image). These processes are generally known, and are not described in detail. The signal processor 205 may be a digital circuit in which processes achieved by using an application-specific integrated circuit (ASIC) or the like are implemented by using hardware, or may be a processor, such as a digital signal processing (DSP) or a microcontroller. Alternatively, the signal processor 205 may be implemented by combining these with each other as appropriate.

In a synchronous dynamic random access memory (SDRAM) 206, the RAW-RGB data which is output from the F/E 204 is stored via the signal processor 205. In the SDRAM 206, an RGB image and a Y/C image which are output from the signal processor 205, and JPEG data and intermediate data of JPEG encoding which are to be stored in a recording unit 211 described below are stored. The processor 207 performs the image recognition processing using semantic segmentation which is described above, and also performs JPEG encoding for storage. The JPEG encoding is implemented by performing discrete cosine transform (DCT), quantization, and Huffman encoding on a Y/C image. In the first embodiment, a DCT coefficient matrix obtained in DCT may be used in other processes. In a read-only memory (ROM) 208, control programs, parameters, constants, and the like which are used in processes performed by the signal processor 205 and the processor 207 are stored.

An operation unit 209 includes various buttons and switches, such as a power ON/OFF switch for turning on the power supply of the image recognition apparatus, and a release button for starting a photographing operation. A display unit 210 includes a liquid crystal display (LCD) monitor on which a Y/C image obtained by capturing an image by using the image recognition apparatus and performing image processing, the result of semantic segmentation performed by the processor 207, and the like are displayed. The recording unit 211 includes a card slot and a controller for a memory card in which a JPEG image and the like which are stored in the SDRAM 206 are written. The signal processor 205, the optical system controller 202, the processor 207, the ROM 208, the operation unit 209, the display unit 210, and the recording unit 211 are connected to one another via a bus line.

Figure 4B:
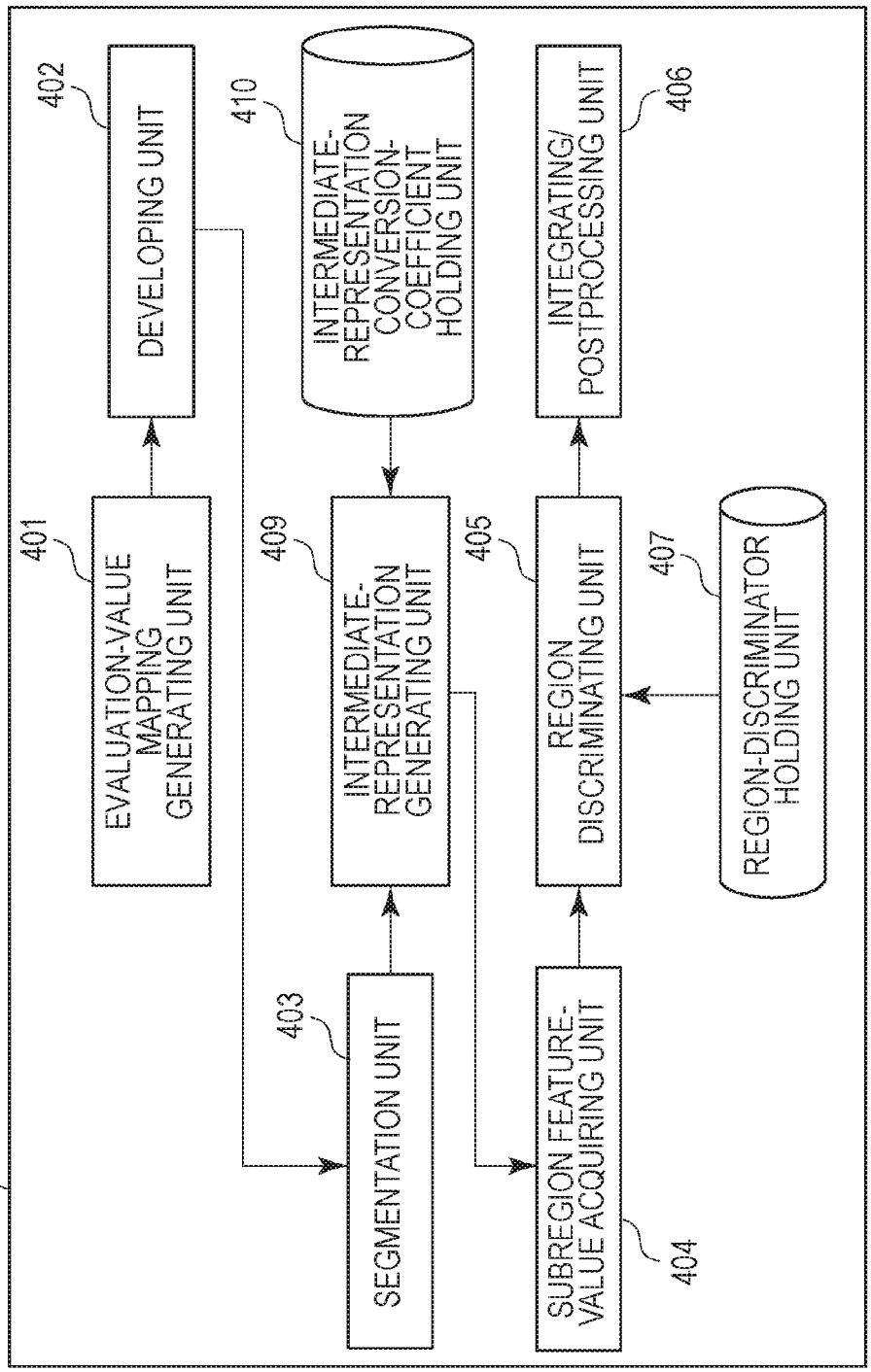

FIGS. 4A and 4B are block diagrams illustrating the schematic functional configurations of the image recognition apparatus 200 according to embodiments. FIG. 4A illustrates the functional configuration of the image recognition apparatus 200 according to the first embodiment. The image recognition apparatus 200 according to the first embodiment includes an evaluation-value mapping generating unit 401, a developing unit 402, a segmentation unit 403, a subregion feature-value acquiring unit 404, a region discriminating unit 405, and an integrating/postprocessing unit 406. Each functional unit is achieved through the hardware configuration included in the image recognition apparatus 200, such as the processor 207, the ROM 208, the operation unit 209, the display unit 210, the recording unit 211, and the signal processor 205. By referring to a flowchart of the image recognition processing using semantic segmentation according to the first embodiment, processes performed by the functional units will be described in detail below.

Figure 6A:
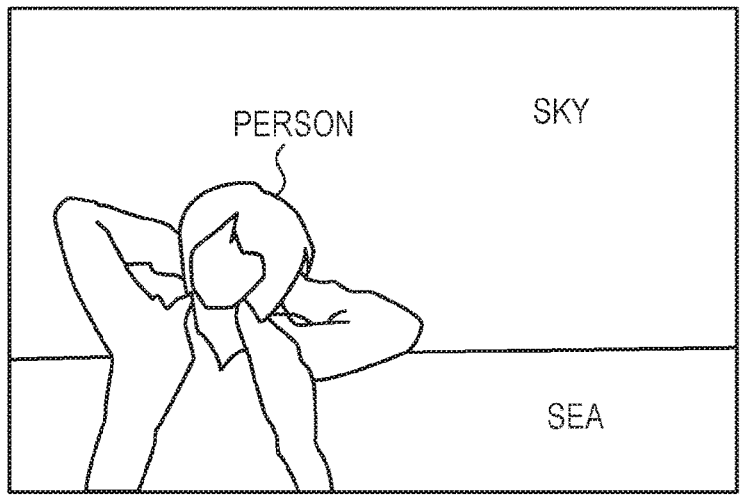
FIGS. 6A to 6C are diagrams for describing results of image recognition processing according to the first embodiment.
Figure 6B:
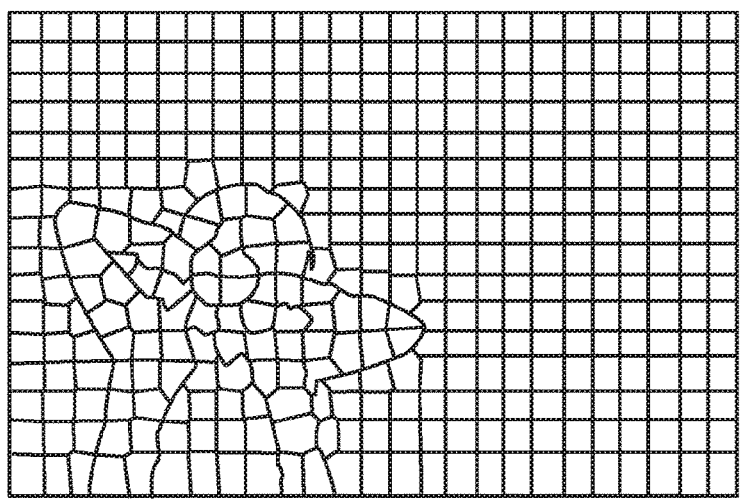
Figure 6C:
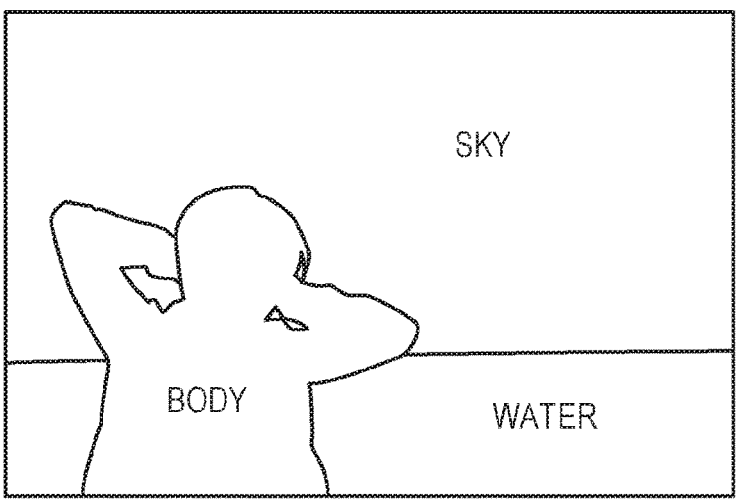

FIGS. 5A to 5C are flowcharts of the image recognition processing using semantic segmentation according to the embodiments. FIG. 5A illustrates a flowchart according to the first embodiment. In the evaluation-value mapping generating process in step S501, the evaluation-value mapping generating unit 401 calculates evaluation values for AF, AE, and AWB from the RAW-RGB data which is an image in which RGB components are arranged in the Bayer arrangement, and generates a mapping for each evaluation value set. The RAW-RGB data is generated by the F/E digitizing an object image formed on the image sensor 203 through the optical system 201. FIGS. 6A to 6C illustrate results of the image recognition processing using semantic segmentation according to the first embodiment. In this example, the RAW-RGB data which is an image in the Bayer arrangement is obtained for a photographed target as illustrated in FIG. 6A. FIG. 6B illustrates a result obtained by segmenting, into subregions called super-pixels (SPs), an RGB image generated by performing interpolation on the RAW-RGB data in the Bayer arrangement which is illustrated in FIG. 6A. FIG. 6C illustrates a result obtained by discriminating a category on the basis of feature values of AF, AE, and AWB evaluation values and the like, and the like for each subregion for the RGB image illustrated in FIG. 6A.

A method of calculating AF evaluation values and generating an AF evaluation value mapping will be described. A description will be made by taking, as an example, a contrast method which is one of methods for achieving AF. In the contrast method, an image of a photographed target is segmented into multiple blocks, and the position of the focusing lens is changed, whereby contrasts in each block are calculated. The position of the focusing lens at which the highest contrast is obtained is set as a focal point.

Figure 7A:
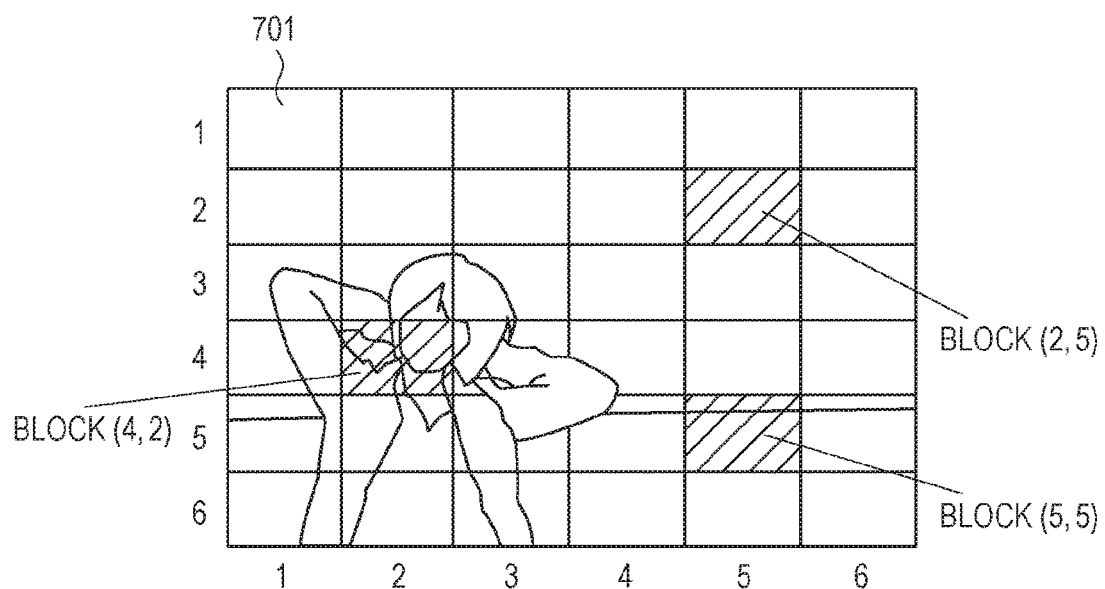
FIGS. 7A to 7D are diagrams for describing automatic focusing (AF) using a contrast method according to the first embodiment.
Figure 7B:
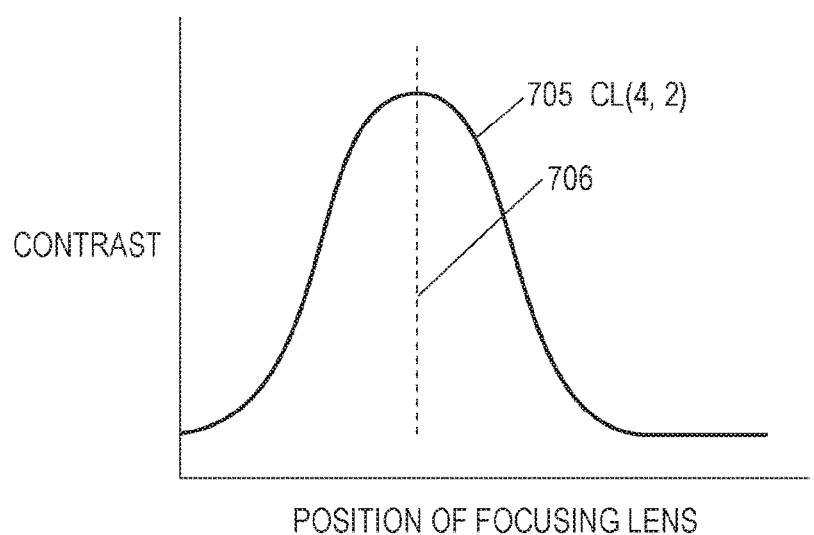
Figure 7C:
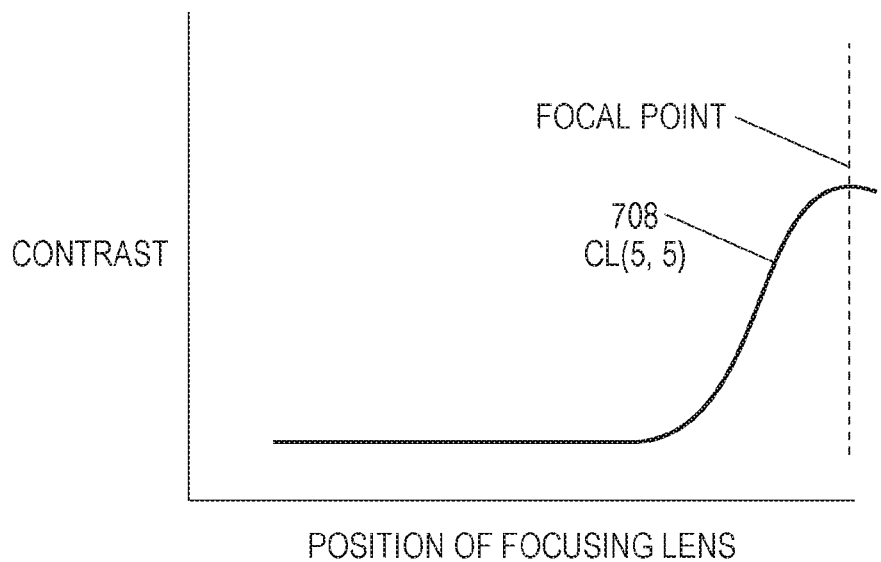

FIGS. 7A to 7D are diagrams for describing AF using the contrast method. As illustrated in FIG. 7A, an image 701 is segmented into blocks by dividing the height and the width of the image 701 into six pieces, and contrast values are obtained for each block. A contrast value is calculated and obtained through extraction of high-frequency components, integration of absolute difference values between adjacent pixels, or the like. FIG. 7B illustrates a graph obtained by plotting contrasts for positions of the focusing lens in block (4, 2) of FIG. 7A; FIG. 7C, in block (5, 5); and FIG. 7D, in block (2, 5). For example, as shown in FIG. 7B, when block (4, 2) is used as a ranging point, a focal point 706 serves as an in-focus position of the focusing lens. Block (2, 5) is located in a sky region. In a region in which a change in contrast is not so large, such as one for the sky, the maximum of contrast does not appear clearly as illustrated by CL(2, 5) shown in FIG. 7D.

Contrast curves 705, 708, and 709 for positions of the focusing lens correspond to the distance from the image capturing apparatus to the object, and also indicate amounts with which the degree of texture of the object in a corresponding one of the blocks is represented. Therefore, the contrast curves 705, 708, and 709 are important information in the image recognition processing according to the first embodiment. In the first embodiment, the contrast distributions themselves (705, 708, 709, and the like) are obtained as an AF evaluation value mapping.

Calculation of contrast values in a block may be made by using mean(Gr, Gb) which is an average of Gr and Gb pixels in the RAW-RGB data in a Bayer arrangement, such as the arrangement 300 illustrated in FIG. 3. However, another method may be used. For example, three mappings may be generated by obtaining contrasts separately for R, mean(Gr, Gb), and B for positions of the focusing lens. Alternatively, an average of R, Gr, Gb, and B pixels may be used to obtain contrast values.

Figure 7D:
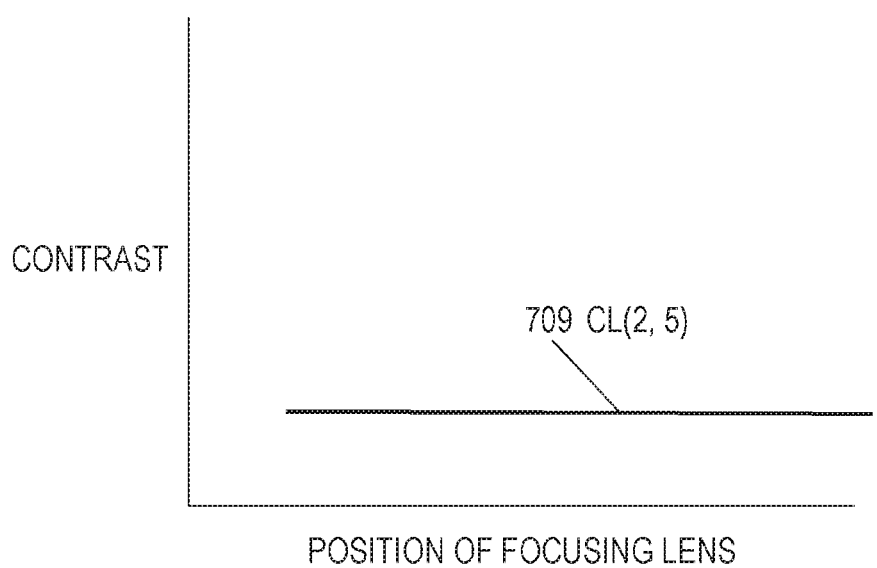

In this example, the image 701 (FIG. 7A) is segmented into 36 blocks. If the area (the number of pixels) per block is too large, the block size may be too coarse to determine the category of a local region. In such a case, blocks having the same size are used and the blocks are allowed to be overlapped, whereby calculation of contrast values may be made more densely. Alternatively, the height and the width of an image are divided increasingly into 50 blocks, 100 blocks, and 500 blocks. For example, contrast values may be calculated in a multiplex manner by using the multiple block types, and the weighted average may be obtained from the calculated contrast values, achieving high resolution. Alternatively, interpolation processing may be performed to obtain a high-resolution mapping from a coarse evaluation value mapping. The contrast curves in FIGS. 7B, 7C, and 7D are obtained from contrast values obtained at positions of the focusing lens. Therefore, to obtain an AF evaluation value mapping, the position of the focusing lens is changed multiple times, and images are captured.

In this example, a region from which contrast values are obtained is described as a block. Contrast values may be obtained for each subregion which is called an SP used in the process in step S503 described below. In this case, an image of a photographed target is segmented into SPs in this step, and the segmentation result is transmitted to the segmentation unit 403, whereby the SP segmentation process is not repeatedly performed in step S503. In acquisition of AWB evaluation values described below, SPs may be also used in a similar manner.

As other AF methods, there are a phase difference method and an on-sensor phase-difference detection method. Instead of an AF evaluation value mapping obtained by using the contrast method, an evaluation value mapping obtained by using these methods may be used. However, using these methods, evaluation values may be typically obtained at extremely sparse positions on the image surface. Therefore, to obtain a mapping, a combination of the contrast method and the phase difference method or the on-sensor phase-difference detection method may be used in the following manner: AF evaluation values are obtained for use at positions at which the phase difference method or the on-sensor phase-difference detection method may be used; and the distribution using the contrast method is used at the other positions. Alternatively, weighting is used so that both of the methods may be mixed with each other.

Recently, use of an image sensor in which phase-difference detecting devices using the on-sensor phase-difference detection method are densely arranged has been common. In this image sensor, AF evaluation values may be densely obtained. Therefore, outputs themselves from the phase-difference detecting devices may be used as an AF evaluation value mapping. In the description made above, the distribution of contrasts and/or phase differences is used in each mapping. Other statistics, such as an average and a standard deviation, may be used.

A method of calculating AE evaluation values and generating an AE evaluation value mapping will be described. In photographing control in an imaging device such as a digital camera, an AE evaluation value is obtained by using a dedicated photometric sensor or is calculated from signal intensity received by the image sensor. In this example, a method of mapping evaluation values will be described under the assumption that appropriate exposure is determined for an object by using either manner.

In the first embodiment, a brightness value BV is used as an AE evaluation value. The brightness value BV corresponds to the physical light intensity of an object. Under appropriate exposure, the brightness value BV satisfies the relation which is defined in the additive system of photographic exposure (APEX) and which is expressed by using Expression 1 described below.

$$BV = AV + TV - SV \qquad \text{Expression 1}$$

The symbols AV, TV, and SV represent values expressed in Expression 2, Expression 3, and Expression 4, respectively;

F represents an aperture value (F-value); etime represents an exposure time; and iso represents the sensitivity.

$$AV = \log_2(F^2) \qquad \text{Expression 2}$$

$$TV = \log_2(1/etime) \qquad \text{Expression 3}$$

$$SV = \log_2(0.3 \cdot iso) \qquad \text{Expression 4}$$

The brightness value BV is a value obtained for one image. By correcting pixel values in the RAW-RGB data as in Expression 5 and Expression 6 described below, the BV for each pixel may be obtained.

$$L^{(i)} = 0.3 \cdot r^{(i)} + 0.6 \cdot g^{(i)} + 0.1 \cdot b^{(i)} \qquad \text{Expression 5}$$

$$BV^{(i)} = BV + \log_2(L^{(i)}/opt) \qquad \text{Expression 6}$$

The symbol i represents the index of a pixel, and $r^{(i)}$, $g^{(i)}$, and $b^{(i)}$ represent pixel values for channels of R, G, and B in a pixel i which are obtained when the RAW-RGB data is subjected to demosaicing and is converted into an image of three RGB channels. The symbol $L^{(i)}$ represents a weighted average of the three channels of the pixel i; opt represents a constant obtained from reference values of an aperture value, an exposure time, and the sensitivity of the image sensor; and $BV^{(i)}$ represents the BV of the pixel i.

In Expression 6, without using the weighted average $L^{(i)}$ of pixel values, values $r^{(i)}$, $g^{(i)}$, and $b^{(i)}$ for R, G, and B are used, whereby a BV mapping for each RGB channel may be obtained as in Expression 7, Expression 8, and Expression 9 described below.

$$BV_r^{(i)} = BV + \log_2(r^{(i)}/opt) \qquad \text{Expression 7}$$

$$BV_g^{(i)} = BV + \log_2(g^{(i)}/opt) \qquad \text{Expression 8}$$

$$BV_b^{(i)} = BV + \log_2(b^{(i)}/opt) \qquad \text{Expression 9}$$

In the first embodiment, BV mappings $BV_r^{(i)}$, $BV_g^{(i)}$, $BV_6^{(i)}$ for RGB are obtained as described above, and are used as an AE evaluation value mapping.

Thus, an AE evaluation value mapping is generated not only for G components as in the related art, but also for each of RGB, whereby intensity information of multiple light spectrum components is used in discrimination. That is, an AE evaluation value mapping for three RGB channels is generated, whereby the number of dimensions of a feature space is increased, and a new discrimination plane may be modeled through training. Therefore, it is effective to improve discrimination performance.

For example, to discriminate a clear sky from the other skies, the B-component light intensity serves as key information. A region having extremely bright R components or a region in which RGB are evenly bright may be recognized as artificial light, a building wall, or a cloudy sky other than a clear sky, enabling discrimination from a clear sky.

A method of calculating AWB evaluation values and generating an AWB evaluation value mapping will be described. The AWB process is image processing in which the color (color temperature) of a light source is estimated from pixel values from the image sensor and in which a change in appearance of the color of the object due to the color of the light source is reduced. Typically, multiple white (achromatic color) regions are extracted from an image, and, among color temperatures for these regions, a color temperature that appears in regions whose number is the largest is used as the color temperature of the entire image. A color temperature is associated with a coefficient (WB coefficient) for reducing a color change. By multiplying the RAW-RGB data by the WB coefficient corresponding to the color temperature, a WB process is performed. The AWB evaluation value according to the first embodiment is a color temperature estimated in the above-described image processing. In this step, the estimated value for the color temperature is obtained, and is mapped.

Typically, a color temperature is determined as one value for the entire image. When multiple light sources are present, multiple values are determined. For example, in an outdoor location during the daytime under a clear sky, two light sources of light from the sun and light from a blue sky other than from the sun are present. In a shadow region, since the light from the sun is shielded, an object which is present in the shadow region mainly receives the light from a blue sky, resulting in occurrence of blue fogging. Therefore, it is difficult to estimate the color temperature for each region correctly only by using white (achromatic color) regions. However, it is possible to obtain the distribution of white regions in the image and the distribution of color temperatures corresponding to the white regions. Such information is useless in the WB process, but may be used as one of pieces of key information for discriminating region categories. Therefore, in the first embodiment, the distribution of color temperatures corresponding to regions is obtained, and is used as a feature value of a local region of the image.

Figure 8:
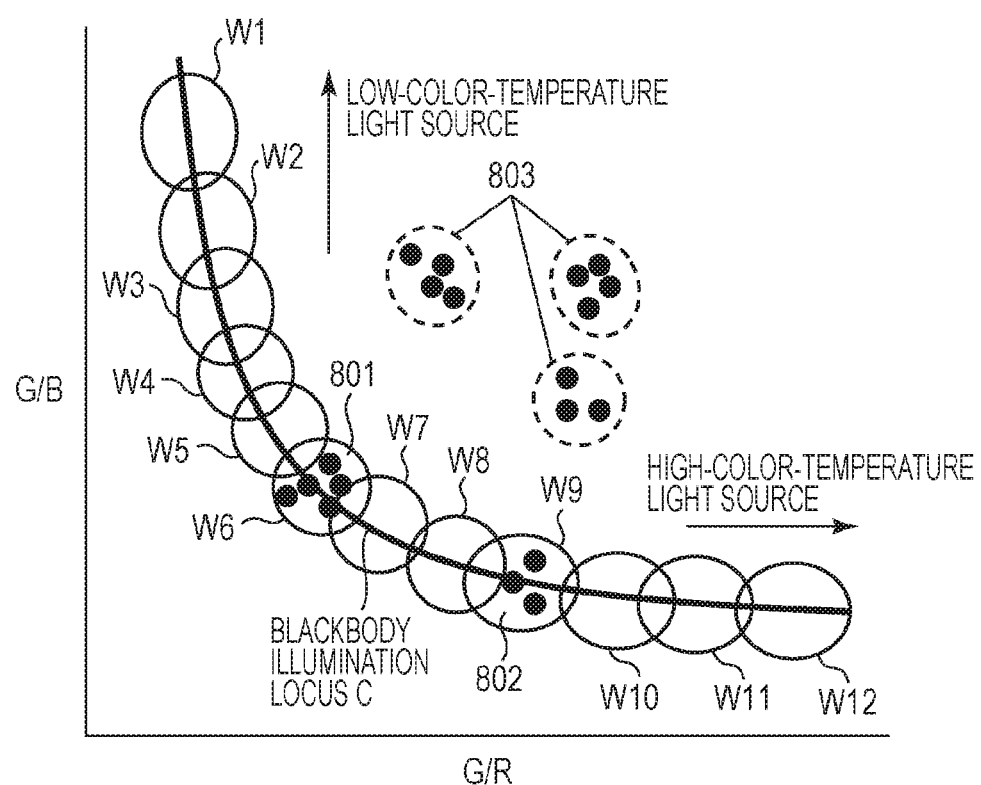
FIG. 8 is a diagram illustrating an example in which color coordinates are plotted in a color space for white balance (WB), according to the first embodiment.

In the first embodiment, the estimated value of color temperature is calculated from an integrated value of each set of RGB values in the RAW-RGB data. The height and the width of an image in a screen are divided into 16 pieces, that is, the image is equally segmented into 256 blocks in total. The integrated values of pixel values in each block are plotted on the color coordinates (G/R, G/B). Then, an area which is assumed to be white (achromatic color) is specified from the distribution of the blocks in the color space. FIG. 8 is a diagram illustrating an example in which the color coordinates of each block are plotted in the WB color space.

As illustrated in FIG. 8, a blackbody illumination locus C obtained by changing the color temperature of a light source is prepared in advance as a reference in the WB color space. Multiple light-source colors assumed to be present under an actual photographing environment are disposed on the locus. Then, regions W1 to W12 which spread to some extent from the center at which the respective light sources are disposed are set as white detection areas. A high-brightness block in which a signal value is saturated, and a dark block in which heavy superimposition of noise is present are excluded, and blocks are plotted on G/R and G/B. When the coordinates of a block are located in any of the white detection areas, the block is likely to reflect white. In the first embodiment, among the white detection areas, an area which satisfies a predetermined condition (such as having blocks whose number is equal to or more than a certain number) in the relationship with the plot distribution is set as a white detection area. That is, assume that multiple white detection areas are present, and that the color temperature corresponding to each of the multiple white detection areas is assigned to a block outside of the white detection areas with a probability which is equal to a rate of the number of blocks in the white detection area. For example, in FIG. 8, the number of blocks in 801 is five, and that in 802 is three. A block corresponding to 803 has the color temperature corresponding to W6 with a probability of 0.625 (=5/8), and has the color temperature corresponding to W9 with a probability of 0.375 (=3/8). In contrast, when a block is in a white detection area, the color temperature for the white detection area is set as the color temperature of the block. In the example in FIG. 8, a block in 801 has the color temperature corresponding to W6 with a probability of 1.0, and a block in 802 has the color temperature corresponding to W9 with a probability of 1.0.

A color temperature mapping obtained as described above may be further subjected to a spatial smoothing and filtering process. An example of such a process may be application of a conditional random field (CRF) (see "Efficient Inference in Fully Connected CRFs with Gaussian Edge Potentials" (PHILIPP Krahenbuhland and Vladlen Koltun, NIPS 2011), which is hereinafter referred to as Non-Patent Document 1). In this case, a light source may be correlated with the brightness and the position. Therefore, a pairwise potential may be set so that a probability of having the same color temperature is set high when the brightness value $BV^{(i)}$ of the pixel i and the position of the pixel are similar to those of another pixel.

In this example, the description is made under the assumption that an image in one screen is divided into 256 blocks, and that the color coordinates (G/R, G/B) are used, but the embodiment is not limited to this form. The number of blocks may be any, and the color space may be another WB color space. Further, similarly to generating of an AF evaluation value mapping, instead of use of blocks, the unit for calculating an integrated value of each set of RGB values may be an SP. For AWB in ordinary image processing, similarly to a typical method, one value may be obtained as an evaluation value.

In the developing process in step S502, the developing unit 402 performs necessary image processing, such as OB clamping, AWB, noise reduction, and contour correction, on the RAW-RGB data, and outputs a Y/C image or a resized RGB image. This process is a typical developing process, and detailed description will be skipped.

In the segmentation process in step S503, the segmentation unit 403 segments the RGB image into multiple subregions (SPs). A subregion is a region, in the RGB image, constituted by multiple pixels whose colors, positions, and feature values are similar to one another. In the first embodiment, segmentation is performed in the following two steps.

In the first step, segmentation is performed so that multiple relatively-small regions, each of which has pixels whose colors and positions are similar to one another, are obtained (hereinafter referred to as SPs). As a method to do this, the method disclosed in "SLIC Superpixels" (A. Shaji, K. Smith, A. Lucchi, and R. Achanta, EPFL Technical Report, 2010) (hereinafter referred to as Non-Patent Document 2) may be used. Other than the method described in Non-Patent Document 2, grid-shaped regions obtained by segmenting an image into rectangles may be used as SPs.

In the next step, a relatively-large subregion is generated by coupling SPs whose feature values are similar to one another (hereinafter referred to a coupled SP). Other than a histogram of RGB, Lab, or the like, and a statistic (an average, a standard deviation, or the like) in an SP, statistics in an SP in an AF evaluation value mapping and an AE evaluation value mapping (BV mapping) which are generated in the evaluation-value mapping generating process S501 may be used as a feature value. Further, texture features may be extracted from an image, and the sum in an SP may be used.

When an AF/AWB evaluation value mapping is generated in step S501 on the basis of SPs, the SPs generated in the evaluation-value mapping generating process in S501 are used as the SPs used in this step, and the same process is not repeatedly performed. When an AF evaluation value mapping is used to couple SPs to one another, the closeness in distribution of contrast among SPs is calculated by using an approximate standard, and the SPs may be coupled to one another in accordance with the closeness. In the case where an AF evaluation value mapping is used to couple SPs to one another, when the AF evaluation value mapping is generated on the basis of blocks, SPs are superimposed on the blocks, and a statistic of contrast in an SP is calculated. When a BV mapping is used to couple SPs to one another, a statistic in an SP may be obtained from the BV of each pixel.

A texture feature may be obtained by calculating a feature value by using local binary pattern (LBP), histogram of gradient (HOG), or the like, or may be obtained by using DCT coefficients for a Y/C image which are used in JPEG encoding. In use of DCT coefficients, a Y/C image is subjected to DCT in this step, and the DCT coefficients which are the result of DCT are temporarily stored in the SDRAM 206. Then, the DCT coefficients are read out again and used in JPEG encoding. The DCT coefficients include DC components independent from texture, and the high-frequency part easily fluctuates due to noise. Therefore, all of the components are not necessarily used, and high-frequency components and DC components may be cut.

To couple similar SPs to one another, a similarity matrix may be generated by using histogram intersection, the Gaussian kernel, or the like, and a spectral clustering method such as Normalized cut may be used (see "Normalized Cuts and Image Segmentation" (Jianbo Shi and Jitendra Malik, IEEE TRANSACTIONS ON PATTERN ANALYSIS AND MACHINE INTELLIGENCE, VOL. 22, NO. 8, 2000)). A graph cut method as described in "Fast Approximate Energy Minimization via Graph Cuts" (Yuri Boykov, Olga Vekser, and Ramin Zabih, IEEE Transactions on PAMI, vol. 23, no. 11), CRF described in Non-Patent Document 1, or the like may be used. In the first embodiment, brightness and chrominance are separately handled for color, and similar SPs are coupled to one another for each of five modal types, the brightness, the chrominance, the AF evaluation value, the By, and the DCT coefficients. That is, six types of subregions in total, i.e., the SP and the five types of coupled SPs obtained by coupling, to one another, SPs which are similar in terms of each of the brightness, the chrominance, the AF evaluation value, the BV, and the DCT coefficients, are generated.

In the subregion feature-value acquiring process in step S504, the subregion feature-value acquiring unit 404 extracts feature values from the SPs and the coupled SPs generated in the segmentation process S503, and obtains feature value information for the SPs and the coupled SPs. In this step, information about color, the evaluation value mappings, and texture is obtained as a feature value. In the first embodiment, the DCT coefficients for the Y/C image have been obtained in the segmentation process S503. Therefore, the DCT coefficients are used as a texture feature. For the AF evaluation value mapping and the AE evaluation value mapping, as described in the description about the segmentation process S503, the feature values of the subregions may be obtained. For the AWB evaluation value mapping, similarly to the AF evaluation value mapping, the values in the subregions are obtained. Similarly to the segmentation process S503, a histogram or a statistic of RGB values or Lab values in a subregion is used as the feature value for color.

In the region discriminating process in step S505, the region discriminating unit 405 uses multiple region discriminators stored in a region-discriminator holding unit 407 to discriminate region categories. The multiple region discriminators discriminate region categories for each subregion on the basis of the feature values obtained in the subregion feature-value acquiring process S504. A region discriminator may be a discriminator, such as multi-class logistic regression or a multi-class support vector machine (SVM), which receives a feature value and which outputs multi-class discrimination results.

The multiple region discriminators are trained for the respective six types of subregions (the SP and the coupled SPs obtained by coupling, to one another, SPs which are similar in terms of each of the brightness, the chrominance, the AF evaluation value mapping, the BV mapping, and the DCT coefficients) which are describe above. The region discriminators are denoted as C1, C2, C3, C4, C5, and C6. Each of the region discriminators receives a corresponding feature value, and the determination result of the region discriminator is obtained. Scores corresponding to region categories are used as a determination result. When three region categories are used, scores $S1_i$, $S2_i$, $S3_i$, $S4_i$, $S5_1$, and $S6_1$ for the categories in the ith SP are obtained from the region discriminators C1, C2, C3, C4, C5, and C6 by using Expression 10 described below.

$$S1_i = \{s1_i^{(1)}, s1_i^{(2)}, s1_i^{(3)}\}, S2_i = \{s2_i^{(1)}, s2_i^{(2)}, s2_i^{(3)}\},$$
$$S3_i = \{s3_i^{(1)}, s3_i^{(2)}, s3_i^{(3)}\}$$

$$S4_i = \{s4_i^{(1)}, s4_i^{(2)}, s4_i^{(3)}\}, S5_i = \{s5_i^{(1)}, s5_i^{(2)}, s5_i^{(3)}\},$$
$$\{s6_i^{(1)}, s6_i^{(2)}, s6_i^{(3)}\}, \quad \text{Expression 10}$$

In the integration/postprocessing process in step S506, for example, when the likelihoods $S1_i$, $S2_i$, $S3_i$, $S4_i$, $S5_i$, and $S6_i$ for the categories are obtained by the region discriminators C1, C2, C3, C4, C5, and C6, a feature value $x_i$ received by an integration discriminator is expressed by using Expression 11 described below.

$$x_i = \{S1_i, S2_i, S3_i, S4_i, S5_i, S6_i\} \quad \text{Expression 11}$$

Other than the score of each region discriminator, the feature value used as an input to the region discriminator may be used as a feature value for the integration discriminator. In this case, training according to this case is performed in the integration-discriminator training process S1005 described below. The scores of the region discriminators may be weighted-averaged and used, or may be simply averaged and used. The above-described process provides likelihoods of the categories for each SP. Finally, spatial smoothing is performed and a final discrimination result is obtained. In the first embodiment, as in Expression 12, CRF described in Non-Patent Document 1 is used to perform smoothing.

$$E(X) = \sum_i \psi_u(x_i) + \sum_{i<j} \psi_p(x_i, x_j) \quad \text{Expression 12}$$

In Expression 12, $\psi_u(x_i)$ represents the likelihood of an SP, and $\psi_p(x_i, x_j)$ represents a potential (pairwise potential) which changes in accordance with similarity between SPs in the feature value and the likelihood. As described in Non-Patent Document 1, the similarity is obtained by using the Gaussian kernel. That is, a category L for which the marginal posterior expressed by using Expression 13 which is described below and in which Z represents a partition function is maximized is used as the final region category.

$$P(L|X) = \exp(-E(X))/Z \quad \text{Expression 13}$$

Figure 9A:
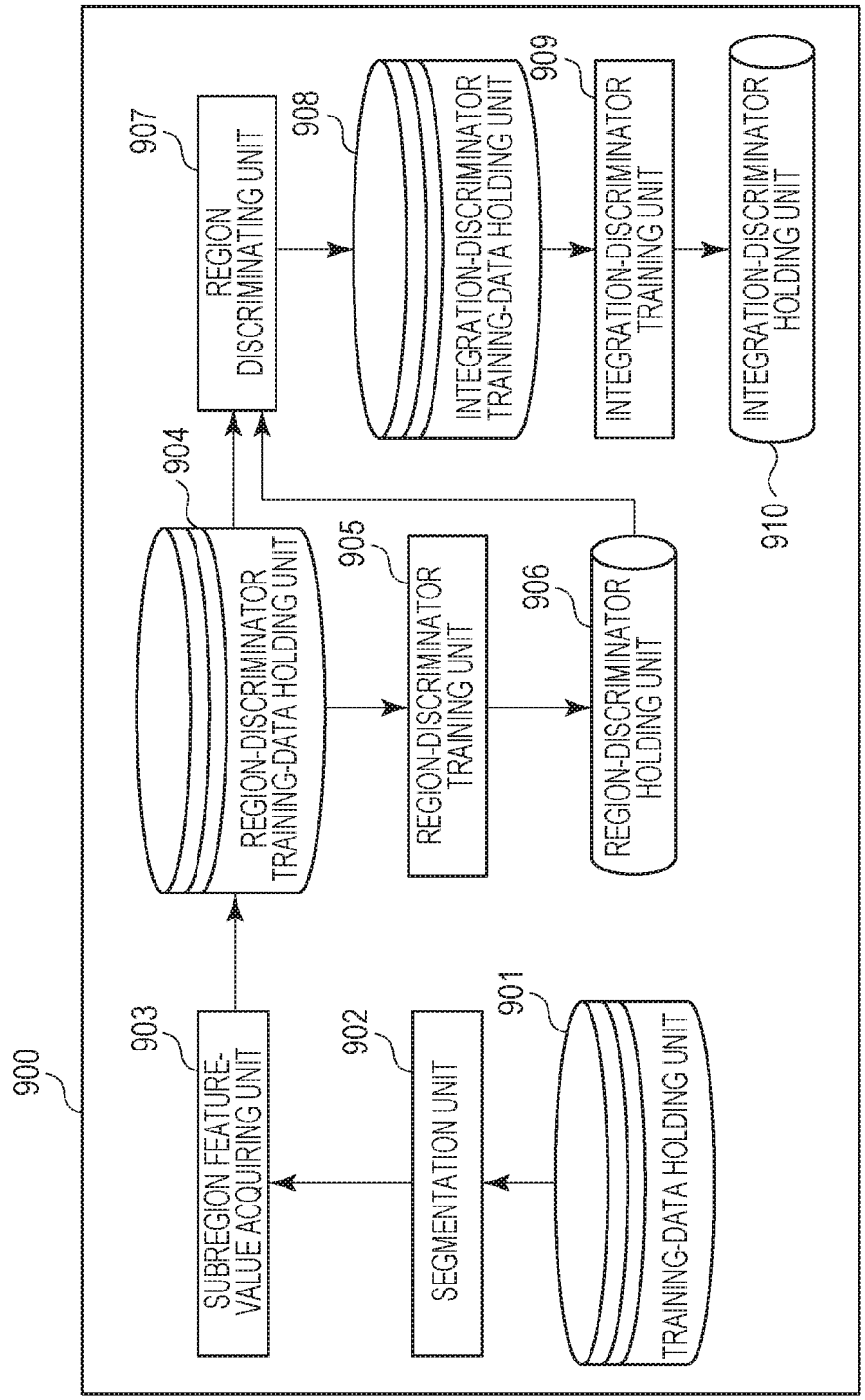
FIGS. 9A and 9B are block diagrams illustrating the schematic functional configurations of a training apparatus according to embodiments.
Figure 9B:
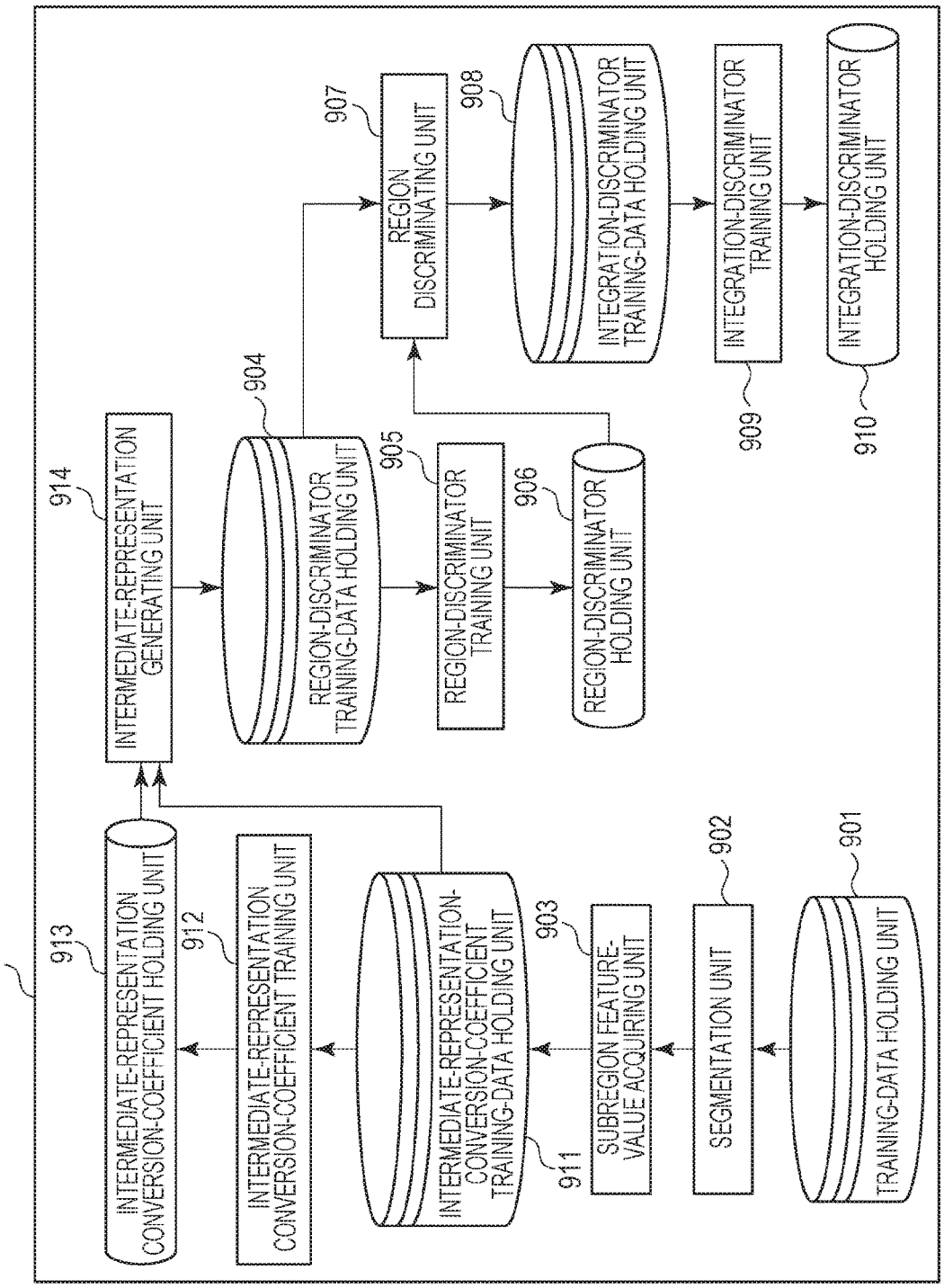

A method of training the region discriminators and the integration discriminator which are used in the region discriminating process S505 and the integration/postprocessing process S506 according to the first embodiment will be described. FIGS. 9A and 9B are block diagrams illustrating schematic functional configurations of a training apparatus according to embodiments. FIG. 9A illustrates a training apparatus 900 according to the first embodiment. The training apparatus 900 includes a segmentation unit 902, a subregion feature-value acquiring unit 903, a region-discriminator training unit 905, a region discriminating unit 907, and an integration-discriminator training unit 909. The training apparatus 900 further includes, as storage units, a training-data holding unit 901, a region-discriminator training-data holding unit 904, an integration-discriminator training-data holding unit 908, and an integration-discriminator holding unit 910. The training apparatus 900 having such a configuration may be implemented through software (programs) obtained via a network or various information recording media, by using a computer constituted, for example, by a central processing unit (CPU), a memory, a storage device, an input/output device, a bus, and a display device. The training apparatus 900 may be an apparatus into which the image recognition apparatus 200 is integrated. In this case, the segmentation unit 902, the subregion feature-value acquiring unit 903, and the like may be functional units common to the segmentation unit 403, the subregion feature-value acquiring unit 404, and the like of the image recognition apparatus 200.

Figure 10A:
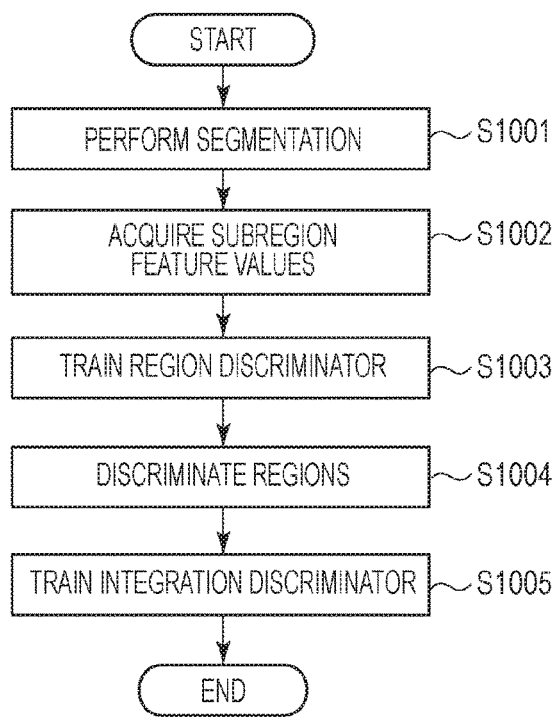
Figure 10B:
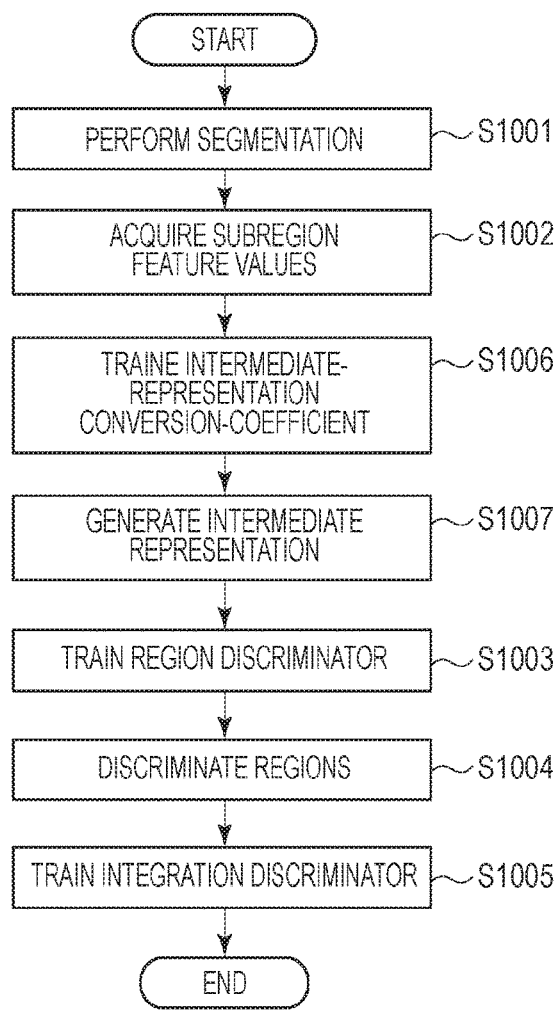

Referring to FIGS. 10A to 10C, a training process performed by the training apparatus according to the first embodiment will be described in detail. FIGS. 10A to 10C illustrate flowcharts of training processes performed by the training apparatus according to the embodiments. FIG. 10A is a flowchart of an exemplary process for training according to the first embodiment. Overview of the steps and functions of the units illustrated in FIG. 9A will be described.

In FIG. 10A, step S1001 is a segmentation process. In the training-data holding unit 901, RGB images which are training data, evaluation value mappings for the RGB images, and region category GT mappings for the training image data in which correct data for each region is given are stored.

In step S1001, the segmentation unit 902 obtains the RGB images which are training data and the evaluation value mappings which are stored in the training-data holding unit 901, and performs segmentation in a manner similar to that in runtime processing (a semantic segmentation process performed by the image recognition apparatus). Then, in the subregion feature-value acquiring process in step S1002, similarly to runtime processing, the subregion feature-value acquiring unit 903 obtains the feature values of the subregions. In this step, the region category GT for the subregions is obtained, and the region category GT and the feature value of each subregion which is obtained for each of the modal types are stored in the region-discriminator training-data holding unit 904.

Then, in the region-discriminator training process in step S1003, the region-discriminator training unit 905 trains the discriminator for each modal type on the basis of the feature value and the region category GT of each subregion which are stored in the region-discriminator training-data holding unit 904. The trained region discriminator is transmitted to the region-discriminator holding unit 906 for storage. For each of six types of subregions, in total, of the SP and the coupled SPs obtained by coupling, to one another, SPs which are similar in terms of each of the brightness, the chrominance, the AF evaluation value mapping, the BV mapping, and the DCT coefficients, the region-discriminator training-data holding unit 904 holds the feature value and the region category GT of each subregion. In the first embodiment, a region discriminator may be any as long as it performs multi-class discrimination. That is, other than multi-class logistic regression and a multi-class support vector machine, a random forest, a neural network, and the like may be applied. Thus, a region discriminator is trained for each of the above-described six region types.

In the region discriminating process in step S1004, the region discriminating unit 907 discriminates the region categories by using the region discriminators trained in the region-discriminator training process S1003, for a set of feature values stored in the region-discriminator training-data holding unit 904. The result of discriminating the region categories for each SP, and the corresponding region category GT are stored in the integration-discriminator training-data holding unit 908.

In the integration-discriminator training process in step S1005, the integration-discriminator training unit 909 trains the integration discriminator on the basis of the determination results from the region discriminators and the region category GT which are stored in the integration-discriminator training-data holding unit 908. The trained integration discriminator is transmitted to the integration-discriminator holding unit 910 for storage. The region category GT corresponding to each SP is used as a teaching value for training, and the determination results from the region discriminators are used as a feature value as described above. That is, for each of six types of subregions, in total, of the SP and the coupled SPs obtained by coupling, to one another, SPs which are similar in terms of each of the brightness, the chrominance, the AF evaluation value mapping, the BV mapping, and the DCT coefficients, the feature values used for the region discriminators as described above may be also used in this step as other feature values. Similarly to the region discriminators, the integration discriminator may be any as long as it performs multi-class discrimination.

In the above description about the first embodiment, the example in which the image recognition apparatus 200 is integrated into an imaging device such as a digital camera is described. The image recognition apparatus 200 according to the first embodiment is not limited to being integrated in the imaging device, and may be separated from an imaging device. In this case, the image recognition apparatus 200 obtains image data in the form of RAW-RGB, an RGB image, or the like from a source other than an integrated imaging device, and obtains information (mapping) about evaluation values for AF, AE, AWB, and the like, as subsidiary information associated with the image data. For example, the image recognition apparatus 200 may obtain the image data from a non-integrated imaging device or from a storage device via a networked connection. On the basis of image date and subsidiary information associated with the image data, image processing of semantic segmentation may be performed.

According to the first embodiment, the image recognition apparatus 200 uses subsidiary information which is obtained upon capture control or storage of an image and which is associated with data (RGB image data) of the image, so as to determine the region category accurately.

Second Embodiment

In the first embodiment, subsidiary information used for capture control or storage of an image, such as evaluation values for AE, AF, and AWB and DCT coefficients, is mapped, and the region category in a local region in the image is determined by using the resulting mappings as a local feature value of the image. The mapped subsidiary information may be sufficient information for region discrimination. However, for example, DCT coefficients may have 64 dimensions for each of Y (luminance value), and Cb and Cr (chrominance values), and may therefore have 192 dimensions for the three channels in total. This may result in too much redundancy for a certain category that is to be determined, or may result in a shortage of memory area. In this example, a two-dimensional base using 8×8 blocks which is typically used in an image compression method, such as JPEG or MPEG, is used in DCT. That is, DCT causes a DCT coefficient matrix having 8×8 (=64) elements to be obtained for each 8×8 block for Y, Cb, and Cr channels of an image. Since a DCT coefficient matrix used as a feature value is handled as a vector, a DCT coefficient matrix vector in this example has 64 dimensions as described above.

In a second embodiment of the present invention, a higher-dimensional subsidiary information mapping is dimensionally compressed into a lower-dimensional intermediate representation. The resulting mapping is used to discriminate regions, achieving lightweight semantic segmentation. The components described in the first embodiment are designated with the same reference numerals, and will not be described again. The dimensional reduction is appropriately determined, for example, depending on which feature value is to be used in semantic segmentation performed in a later stage. The degree to which the dimensional reduction is to be achieved may be determined as appropriate, for example, in accordance with system specification.

FIG. 4B is a block diagram illustrating the schematic functional configuration of the image recognition apparatus 200 according the second embodiment. The image recognition apparatus 200 according to the second embodiment includes an intermediate-representation generating unit 409 and an intermediate-representation conversion-coefficient holding unit 410, in addition to the functional units in the first embodiment. FIG. 5B is a flowchart of image recognition processing using semantic segmentation which is performed by the image recognition apparatus 200 according to the second embodiment. Referring to FIG. 5B, the intermediate-representation generating unit 409 and the intermediate-representation conversion-coefficient holding unit 410 according to the second embodiment will be described in detail.

In the image recognition processing using semantic segmentation which is illustrated in FIG. 5B, the difference from that in the first embodiment in FIG. 5A is that the intermediate-representation generating process in step S507 is added. In the intermediate-representation generating process S507, the intermediate-representation generating unit 409 generates a lower-dimensional intermediate representation from a higher-dimensional feature value of each subregion which is obtained in the subregion feature-value acquiring process S504. In generating of the lower-dimensional intermediate representation, any dimension reducing method such as principal component analysis may be used. The intermediate representation indicates a feature value obtained by making some change on an original feature value, and is not necessarily limited to one obtained through dimensional reduction. A low-dimensional feature value obtained through dimensional reduction is also one of intermediate representations. In the second embodiment, kernel Fisher discriminant analysis is used (see "Generalized discriminate analysis using a kernel approach" (G. Baudat and F. Anouar, Neural Computation 12(10): 2000) which is hereinafter referred to as Non-Patent Document 5). The reason of use of kernel Fisher discriminant analysis is as follows: in the second embodiment, the category GT for each subregion is given, and the frame of supervised learning may be used to reduce the number of dimensions; and, for a certain region category, linear discrimination may not be used. Kernel Fisher discriminant analysis is applicable to all feature values. In the second embodiment, kernel Fisher discriminant analysis is used especially for DCT coefficients having a high feature dimension. However, a target for which an intermediate representation is generated is not always limited to DCT coefficients. For DCT coefficients, the intermediate-representation generating unit 409 uses discriminating coefficients stored in the intermediate-representation conversion-coefficient holding unit 410, so as to perform determination analysis for each category and generate a lower-dimensional intermediate representation. The generated intermediate representation is transmitted to the region discriminating unit 405. Feature values which are other than DCT coefficients and which are received from the subregion feature-value acquiring unit 404 are transmitted to the region discriminating unit 405. The region discriminating unit 405 handles, as feature values for each subregion, the generated intermediate representation and the feature values generated by the subregion feature-value acquiring unit 404 in a similar manner.

FIG. 9B is a block diagram illustrating the schematic functional configuration of the training apparatus 900 according to the second embodiment. The training apparatus 900 according to the second embodiment includes an intermediate-representation conversion-coefficient training unit 912, an intermediate-representation generating unit 914, an intermediate-representation-conversion-coefficient training-data holding unit 911, and an intermediate-representation conversion-coefficient holding unit 913, in addition to the functional units in the first embodiment which are illustrated in FIG. 9A. FIG. 10B is a flowchart of a training process performed by the training apparatus 900 according to the second embodiment. Referring to FIG. 10B, the intermediate-representation conversion-coefficient training unit 912, the intermediate-representation generating unit 914, the intermediate-representation-conversion-coefficient training-data holding unit 911, and the intermediate-representation conversion-coefficient holding unit 913 according to the second embodiment will be described in detail.

In the training process in FIG. 10B, the difference from that in the first embodiment in FIG. 10A is that the intermediate-representation conversion-coefficient training process in step S1006 and the intermediate-representation generating process in step S1007 are added. In the subregion feature-value acquiring process in step S1002, according to the second embodiment, among the obtained feature values for each subregion, a feature value to be converted into an intermediate representation, and the corresponding region category GT are transmitted to the intermediate-representation-conversion-coefficient training-data holding unit 911 for storage.

The intermediate-representation conversion-coefficient training process S1006 will be described. In step S1006, the intermediate-representation conversion-coefficient training unit 912 trains coefficients used in conversion into an intermediate representation. In this step, kernel Fisher discriminant analysis described in Non-Patent Document 5 described above is applied. The trained conversion coefficients are transmitted to the intermediate-representation conversion-coefficient holding unit 913 for storage.

In the intermediate-representation generating process in step S1007, the intermediate-representation generating unit 914 uses the conversion coefficients stored in the intermediate-representation conversion-coefficient holding unit 913 to convert a feature value of each subregion which is stored in the intermediate-representation-conversion-coefficient training-data holding unit 911 into an intermediate representation. The conversion result and the region category GT corresponding to the conversion result, and feature values for each subregion which are not converted into an intermediate representation are transmitted to the region-discriminator training-data holding unit 904 for storage.

As described above, according to the second embodiment, the image recognition apparatus 200 uses subsidiary information which is obtained upon capture control or storage of an image and which is associated with data (RGB image data) about an image, and converts the subsidiary information into an intermediate representation. Thus, in the second embodiment, lightweight and accurate region category determination may be made.

Third Embodiment

In the first and second embodiments, subsidiary information associated with image data obtained upon capture of an image is mapped, and the resulting mapping is converted into a feature value of a local region in the image so that the region category is determined. On the other hand, information which may be obtained for one image, such as the brightness of the entire image and a time, is present. This enables classification of an image-photographed scene. That is, on the basis of image data and subsidiary information, a global feature value of a captured image is obtained, and scene recognition is performed. By using the scene recognition result, region discrimination adapted to each photographed scene is performed, whereby it is expected that accuracy in semantic segmentation is further improved. Therefore, in the a third embodiment of the present invention, a configuration will be described in which subsidiary information which may be obtained upon capture of an image is used to perform scene recognition, and in which the result is used in semantic segmentation. The components described in the first or second embodiment are designated with identical reference numerals, and will not be described.

Figure 11:
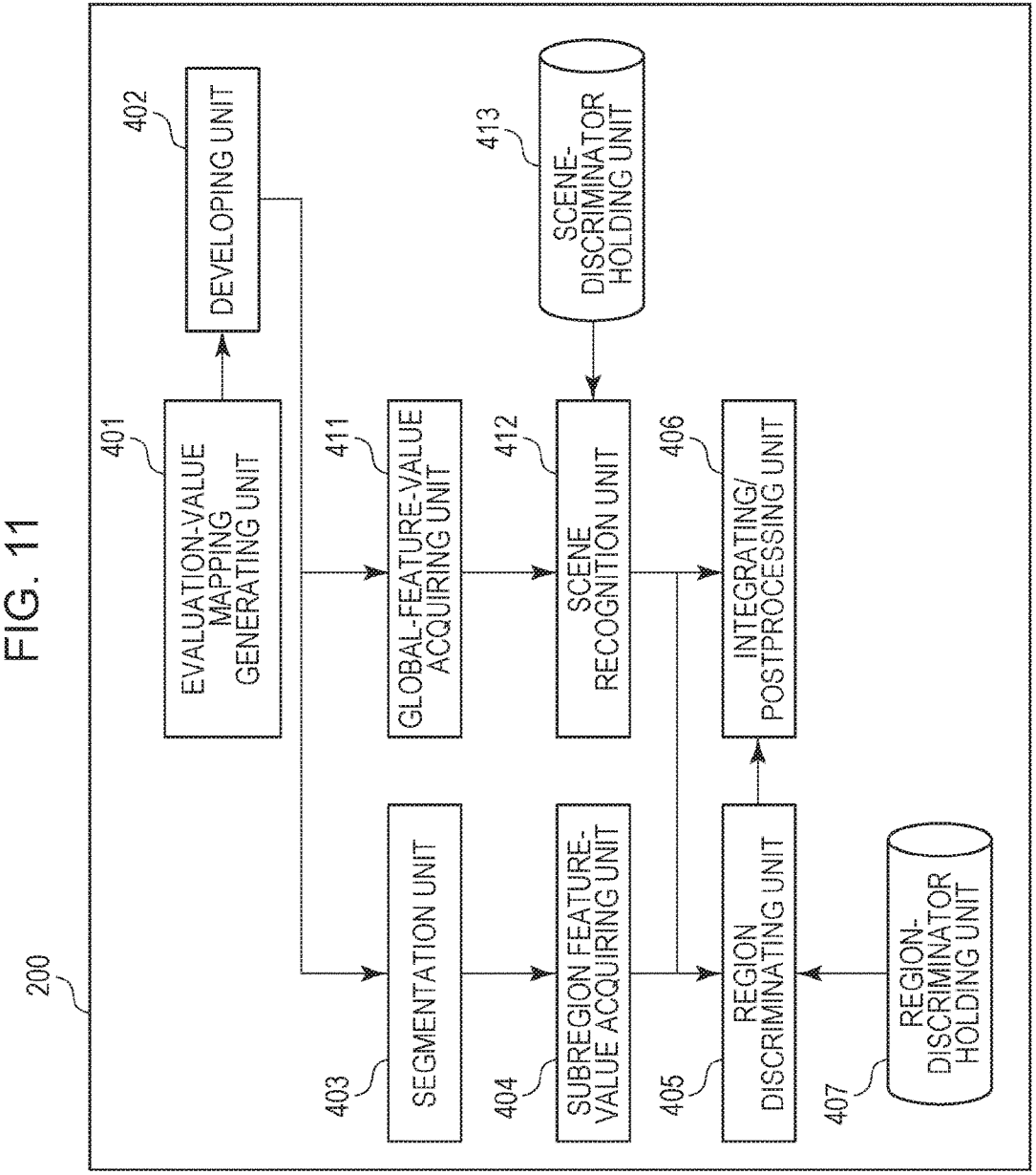
FIG. 11 is a block diagram illustrating the schematic functional configuration of an image recognition apparatus according to a third embodiment.

FIG. 11 is a block diagram illustrating the schematic functional configuration of the image recognition apparatus 200 according to the third embodiment. The image recognition apparatus 200 according to the third embodiment includes a global-feature-value acquiring unit 411 and a scene recognition unit 412, in addition to the functional units in the first embodiment. FIG. 5C is a flowchart of image recognition processing using semantic segmentation which is performed by the image recognition apparatus 200 according to the third embodiment. Referring to FIG. 5C, the global-feature-value acquiring unit 411 and the scene recognition unit 412 according to the third embodiment will be described in detail. As illustrated in FIG. 5C, in the image recognition processing using semantic segmentation which is performed by the image recognition apparatus according to the third embodiment, the global-feature-value acquiring process in step S508 and the scene recognition process in step S509 are added to that in the first embodiment.

In the global-feature-value acquiring process S508, the global-feature-value acquiring unit 411 extracts a global feature value from received image data and subsidiary information associated with the image data. The global feature value is a feature value extracted from the entire image. More specifically, the global feature value indicates the bag-of-words (BOW) feature described in "Visual categorization with bags of key points" (G. Csurka, C. Dance, L. Fan, J. Willamowski, and C. Bray, ECCV SLCV Workshop, 2004), the spatial pyramid matching kernel described in "Beyond Bags of Features, Spatial Pyramid Matching for Recognizing, Neural Scene Categories" (S. Lazebnik, C. Schmid, and J. Ponce, CVPR, 2006), the GIST feature described in "Modeling the shape of the scene: a holistic representation of the spatial envelope" (A. Oliva and A. Torralba, International Journal of Computer Vision, 2001), and the like. Other than these, a more simplified feature value, such as a feature value obtained by converting RGB values in an image into a histogram, or a feature value obtained by converting, into a histogram, RGB values in each of the blocks obtained through segmentation of an image, may be used. Other than these, AF, AE, and AWB evaluation values, that is, a BV, a color temperature, and the like, may be used. Alternatively, a BoW may be generated from the evaluation value mappings according to the first embodiment. The global feature value generated by the global-feature-value acquiring unit 411 is transmitted to the scene recognition unit 412.

In the scene recognition process S509, the scene recognition unit 412 uses the scene discriminator stored in a scene-discriminator holding unit 413 to perform scene recognition on the basis of the global feature value of the input image obtained by the global-feature-value acquiring unit 411. The scene indicates a category defined in advance in accordance with the object of an image, such as a portrait, a town, or nature. The scene discriminator may be any as long as it receives a feature value and outputs a multi-class discrimination result, such as multi-class logistic regression and a multi-class SVM.

Figure 12:
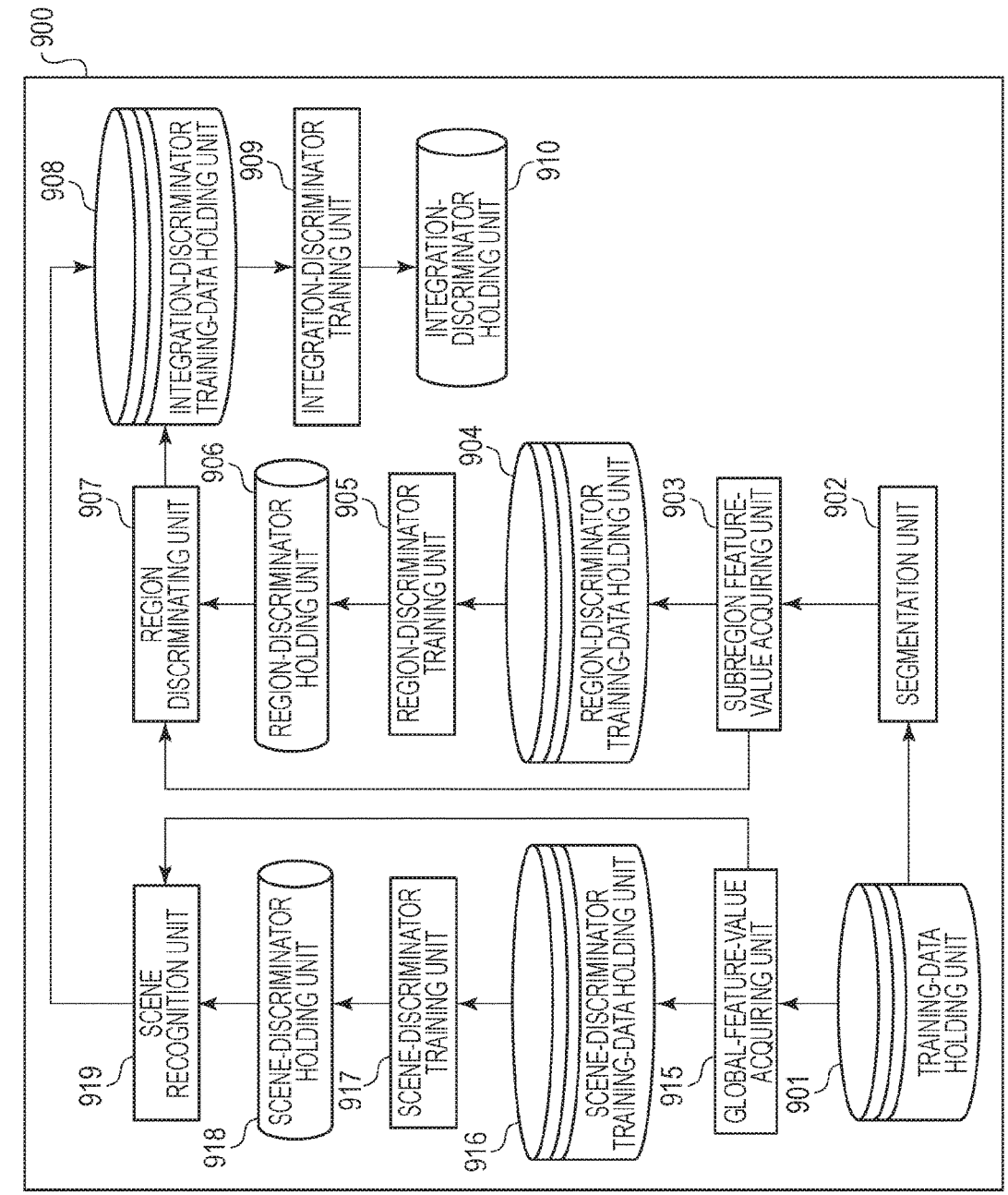
FIG. 12 is a block diagram illustrating the schematic functional configuration of a training apparatus according to the third embodiment.

A training process according to the third embodiment will be described. FIG. 12 is a block diagram illustrating the schematic functional configuration of the training apparatus 900 according to the third embodiment. The training apparatus 900 according to the third embodiment includes a global-feature-value acquiring unit 915, a scene-discriminator training unit 917, a scene recognition unit 919, a scene-discriminator training-data holding unit 916, and a scene-discriminator holding unit 918, in addition to the functional units in the first embodiment which are illustrated in FIG. 9A. FIG. 10C is a flowchart of the training process performed by the training apparatus 900 according to the third embodiment. Referring to FIG. 10B, the configuration of the training apparatus 900 according to the third embodiment will be described.

In the training process illustrated in FIG. 10C, the difference from that in the first embodiment in FIG. 10A is that the global-feature-value acquiring process in step S1008, the scene-discriminator training process in step S1009, and the scene recognition process in step S1010 are added. In the third embodiment, training RGB image data, evaluation value mappings, other subsidiary information, the region category GT, and the scene category GT are stored in the training-data holding unit 901.

In the global-feature-value acquiring process S1008, similarly to the global-feature-value acquiring process S508 performed in runtime processing, the global-feature-value acquiring unit 915 obtains a global feature value from training image and subsidiary information. The global feature value obtained in this step is transmitted to the scene-discriminator training-data holding unit 916 for storage. At the same time, the scene category GT is stored.

In the scene-discriminator training process S1009, the scene-discriminator training unit 917 trains the scene discriminator by using the global feature value stored in the scene-discriminator training-data holding unit 916 and the scene category GT provided for the input image. As described above, the scene discriminator may be any as long as it performs multi-class discrimination. That is, other than the multi-class logistic regression and a multi-class support vector machine, a random forest, a neural network, or the like may be applied. The scene discriminator trained in this step is transmitted to the scene-discriminator holding unit 918 for storage.

In the scene discriminating process S1010, the scene recognition unit 919 uses the scene discriminator trained in the scene-discriminator training process S1009 to perform scene recognition on the basis of the global feature value stored in the scene-discriminator training-data holding unit 916. The scene recognition result is transmitted to the integration-discriminator training-data holding unit 908 for storage.

In the integration-discriminator training process S1005, the integration-discriminator training unit 909 trains the integration discriminator for determining the region category by using the region discrimination result for each region type, the scene recognition result, and the region category GT which are stored in the integration-discriminator training-data holding unit 908. Similarly to the scene discriminator, the integration discriminator may be any as long as it performs multi-class discrimination.

As described above, according to the third embodiment, the image recognition apparatus 200 uses subsidiary information which is obtained upon capture control or storage of an image and which is associated with data (RGB image data) about an image, so as to recognize the scene of the image. The determination result for the final region category of a local region is made from the results of discriminating region categories and the scene recognition result, enabling the region category determination to be made accurately.

By using subsidiary information obtained upon capture of an image, the above-described configuration enables semantic segmentation to be performed with high accuracy.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-115171 filed Jun. 5, 2015, which is hereby incorporated by reference herein in its entirety.

What is claimed is:

1. An image recognition apparatus comprising:
a memory; and
a processor in communication with the memory, the processor configured to provide:
an acquiring unit configured to acquire image data of a plurality of color components for a captured image and an image capturing parameter used for capturing the image;
a generation unit configured to generate, based on the acquired image capturing parameter and the acquired plurality of color components, a plurality of evaluation maps, wherein each map represents evaluation values for a plurality of regions in an image represented by the acquired image data and a respective one of the plurality of color components, the evaluation values including at least an evaluation value about exposure that has been performed when the image was captured;
an extracting unit configured to extract a feature value from each of the plurality of regions in the image represented by the acquired image data; and
a determination unit configured to determine a category for each of the plurality of regions on a basis of the evaluation values for the color components and the extracted feature value.

2. The image recognition apparatus according to claim 1, wherein the evaluation value about the exposure is an evaluation value about a brightness value for each pixel in the image for the image data.

3. The image recognition apparatus according to claim 1, wherein the evaluation value about the exposure is an evaluation value about a brightness values for each RGB channel of an image sensor that captures the image for the image data.

4. The image recognition apparatus according to claim 1, wherein the evaluation values further include an evaluation value about automatic focusing and an evaluation value about automatic white balance.

5. The image recognition apparatus according to claim 4, wherein the evaluation value about automatic focusing is an evaluation value about a contrast values for each of a plurality of blocks which are obtained by segmenting the image for the image data.

6. The image recognition apparatus according to claim 5, wherein the plurality of blocks are set as subregions identical to the plurality of regions.

7. The image recognition apparatus according to claim 4, wherein the evaluation value about automatic white balance is an evaluation value about a color temperature for each of a plurality of blocks which are obtained by segmenting the image for the image data.

8. The image recognition apparatus according to claim 1, wherein the extracting unit extracts feature values for color and texture of the image as the feature value.

9. The image recognition apparatus according to claim 1, wherein the processor is further configured to provide:
an intermediate-representation generating unit configured to convert the extracted feature value into a predetermined intermediate representation.

10. The image recognition apparatus according to claim 1, wherein the processor is further configured to provide:
a scene recognizing unit configured to recognize a scene of the image for the image data on the basis of a global feature value of the image data,
wherein the determination unit determines the category for each of the plurality of regions on the basis of the recognized scene of the image.

11. The image recognition apparatus according to claim 1, wherein the processor is further configured to provide:
a training unit configured to train a discriminator on a basis of training data and the evaluation value of training image data, the discriminator determining the category for each of the plurality of regions, the training data being data for which correct data of a category for each of a plurality of training regions in the training image data is provided,
wherein the determination unit determines the category for each of the plurality of regions by using the trained discriminator.

12. The image recognition apparatus according to claim 1, wherein each of the plurality of regions includes multiple pixels of the image.

13. The image recognition apparatus according to claim 1, wherein, as the image capturing parameter, the acquiring unit acquires an aperture value at a timing of capturing the image, exposure time at a timing of capturing the image, and sensitivity of an image sensor at a timing of capturing the image.

14. The image recognition apparatus according to claim 1, wherein the image data is RAW data.

15. The image recognition apparatus according to claim 1, wherein the processor is further configured to provide:
a segmenting unit configured to segment the captured image into the plurality of regions on a basis of the evaluation value;
wherein, on the basis of the evaluation value and the feature value for each of the plurality of regions obtained through the segmentation, the determination unit determines the category for each of the plurality of regions.

16. An image recognition method comprising:
acquiring image data of a plurality of color components for a captured image and an image capturing parameter used for capturing the image;
generating, based on the acquired image capturing parameter and the acquired plurality of color components of the captured image, a plurality of evaluation maps, wherein each map represents evaluation values for a plurality of regions in an image represented by the acquired image data and a respective one of the plurality of color components, the evaluation values including at least an evaluation value about exposure that has been performed when the image was captured;
extracting a feature value from each of the plurality of regions in the image represented by the acquired image data; and
determining a category for each of the plurality of regions on a basis of the evaluation values for the color components and the extracted feature value.

17. A non-transitory computer-readable recording medium that stores a program for causing a computer to execute an image recognition method comprising:

acquiring image data of a plurality of color components for a captured image and an image capturing parameter used for capturing the image;

generating, based on the acquired image capturing parameter and the acquired plurality of color components of the captured image, a plurality of evaluation maps, wherein each map represents evaluation values for a plurality of regions in an image represented by the acquired image data and a respective one of the plurality of color components, the evaluation values including at least an evaluation value about exposure that has been performed when the image was captured;

extracting a feature value from each of the plurality of regions in the image represented by the acquired image data; and determining a category for each of the plurality of regions on a basis of the evaluation values for the color components and the extracted feature value.

\* \* \* \* \*